(12) United States Patent
O'Keeffe

(10) Patent No.: US 10,509,242 B2
(45) Date of Patent: Dec. 17, 2019

(54) MICRO-FASTENED, SEALED LIGHT MODULATOR

(71) Applicant: Vlyte Innovations Limited, Shannon Airport (IE)

(72) Inventor: Donal O'Keeffe, Parteen (IE)

(73) Assignee: Vlyte Innovations Limited, Shannon Airport (IE)

( * ) Notice: Subject to any disclaimer, the term of this patent is extended or adjusted under 35 U.S.C. 154(b) by 106 days.

(21) Appl. No.: 15/564,229

(22) PCT Filed: Mar. 22, 2016

(86) PCT No.: PCT/EP2016/056225
§ 371 (c)(1),
(2) Date: Oct. 4, 2017

(87) PCT Pub. No.: WO2016/162202
PCT Pub. Date: Oct. 13, 2016

(65) Prior Publication Data
US 2018/0129080 A1 May 10, 2018

(30) Foreign Application Priority Data
Apr. 10, 2015 (GB) .................................. 1506147.6

(51) Int. Cl.
*G02B 26/00* (2006.01)
*G02F 1/01* (2006.01)
(Continued)

(52) U.S. Cl.
CPC ......... *G02F 1/0107* (2013.01); *G02B 26/004* (2013.01); *G02B 26/005* (2013.01); *G02F 1/167* (2013.01); *G02F 1/1681* (2019.01)

(58) Field of Classification Search
CPC .. G02B 26/0833; G02B 26/00; G02B 26/004; G02B 26/005; G02B 1/14; G02B 3/0062;
(Continued)

(56) References Cited

U.S. PATENT DOCUMENTS 4,298,448 A 11/1981 Müller et al.
5,285,517 A 2/1994 Wu
(Continued)

FOREIGN PATENT DOCUMENTS

EP 2073057 A2 6/2009
EP 2998786 A1 3/2016
(Continued)

OTHER PUBLICATIONS

Aizenberg, Joanna, et al., "Patterned Colloidal Deposition Controlled by Electrostatic and Capillary Forces," Physical Review Letters, vol. 84, Issue 13, Mar. 27, 2000, The American Physical Society, pp. 2997-3000.
(Continued)

*Primary Examiner* — Brandi N Thomas
(74) *Attorney, Agent, or Firm* — Withrow & Terranova, P.L.L.C.

(57) ABSTRACT

A switchable light modulator device comprises a fluid layer disposed between opposite spaced apart major surfaces of first and second substrates. Each of the substrates comprise first and second interoperable microstructures formed on the opposite major surfaces. The respective microstructures fit together to join the first and second substrates and to define wall portions for a plurality of cavities, the cavities sealing said fluid in discrete volumes.

19 Claims, 19 Drawing Sheets

(51) Int. Cl.
*G02F 1/1681* (2019.01)
*G02F 1/167* (2019.01)

(58) Field of Classification Search
CPC .. G02B 6/0018; G02B 6/0036; G02B 6/0065; G02B 3/0056; G02B 26/023; G02B 26/0841; G02B 5/3016; G02B 5/3083
USPC ........ 359/237, 238, 242, 265–267, 290–292, 359/298
See application file for complete search history.

(56) References Cited

U.S. PATENT DOCUMENTS

| | | | |
|---|---|---|---|
| 6,410,213 | B1 | 6/2002 | Raguin et al. |
| 6,515,649 | B1 | 2/2003 | Albert et al. |
| 6,900,923 | B2 | 5/2005 | Chakrapani et al. |
| 6,934,067 | B2 | 8/2005 | Ash et al. |
| 7,002,758 | B2 | 2/2006 | Uno et al. |
| 7,319,554 | B1 | 1/2008 | Abe et al. |
| 7,417,787 | B2 | 8/2008 | Chopra et al. |
| 7,470,386 | B2 | 12/2008 | Kang et al. |
| 7,824,516 | B2 | 11/2010 | Amos et al. |
| 7,951,938 | B2 | 5/2011 | Yang et al. |
| 7,957,054 | B1 | 6/2011 | Yeo et al. |
| 8,174,755 | B2 | 5/2012 | Yamamoto et al. |
| 8,184,357 | B2 | 5/2012 | Yeo et al. |
| 8,837,032 | B2 | 9/2014 | Lam et al. |
| 8,854,714 | B2 | 10/2014 | Clapp et al. |
| 2002/0186197 | A1 | 12/2002 | Biegelsen |
| 2003/0160923 | A1* | 8/2003 | Ma .................. G02F 1/133555 349/115 |
| 2007/0146310 | A1 | 6/2007 | Paolini, Jr. et al. |
| 2008/0130092 | A1 | 6/2008 | Whitesides et al. |
| 2008/0310158 | A1 | 12/2008 | Harbers et al. |
| 2009/0268303 | A1 | 10/2009 | Takai |
| 2011/0149376 | A1 | 6/2011 | Mabeck et al. |
| 2012/0134010 | A1 | 5/2012 | Sprague et al. |
| 2012/0230633 | A1 | 9/2012 | Kusuura |
| 2012/0250141 | A1 | 10/2012 | Chen |
| 2013/0265536 | A1* | 10/2013 | Hashimoto ............ G02C 7/083 349/153 |
| 2014/0355101 | A1 | 12/2014 | Shian et al. |

FOREIGN PATENT DOCUMENTS

| | | |
|---|---|---|
| WO | 2005024767 A1 | 3/2005 |
| WO | 2006108285 A1 | 10/2006 |
| WO | 2009000521 A1 | 12/2008 |
| WO | 2011154104 A1 | 12/2011 |
| WO | 2012076884 A1 | 6/2012 |
| WO | 2013110564 A1 | 8/2013 |
| WO | 2014146937 A2 | 9/2014 |

OTHER PUBLICATIONS

Hansen, Charles, "Hansen Solubility Parameters: A User's Handbook," Second Edition, 2007, CRC Press, Boca Raton, Florida, 546 pages.

Schneider, Tod, et al., "50.4: Flexible Encapsulated Cholesteric LCDs by Polymerization Induced Phase Separation," SID Symposium Digest of Technical Papers, vol. 36, Issue 1, May 2005, Society for Information Display, pp. 1568-1571.

Zehner, Robert, et al., "20.2: Drive Waveforms for Active Matrix Electrophoretic Displays," SID Symposium Digest of Technical Papers, vol. 34, Issue 1, May 2003, Society for Information Display, pp. 842-845.

Non-Final Office Action for U.S. Appl. No. 14/772,919, dated Jun. 29, 2017, 14 pages.

Non-Final Office Action for U.S. Appl. No. 14/772,919, dated Dec. 14, 2017, 14 pages.

International Search Report and Written Opinion for International Patent Application No. PCT/EP2014/054734, dated Nov. 12, 2014, 26 pages.

International Preliminary Report on Patentability for International Patent Application No. PCT/EP2014/054734, dated Oct. 1, 2015, 19 pages.

International Search Report and Written Opinion for International Patent Application No. PCT/EP2014/072241, dated Jan. 14, 2015, 8 pages.

international Preliminary Report on Patentability for International Patent Application No. PCT/EP2014/072241, dated May 6, 2016, 15 pages.

International Search Report and Written Opinion for International Patent Application No. PCT/EP2016/056225, dated May 25, 2016, 7 pages.

International Preliminary Report on Patentability for International Patent Application No. PCT/EP2016/056225, dated Oct. 10, 2017, 5 pages.

Result of Consulation for European Patent Application No. 16712792. 7, dated Mar. 15, 2019, 6 pages.

* cited by examiner

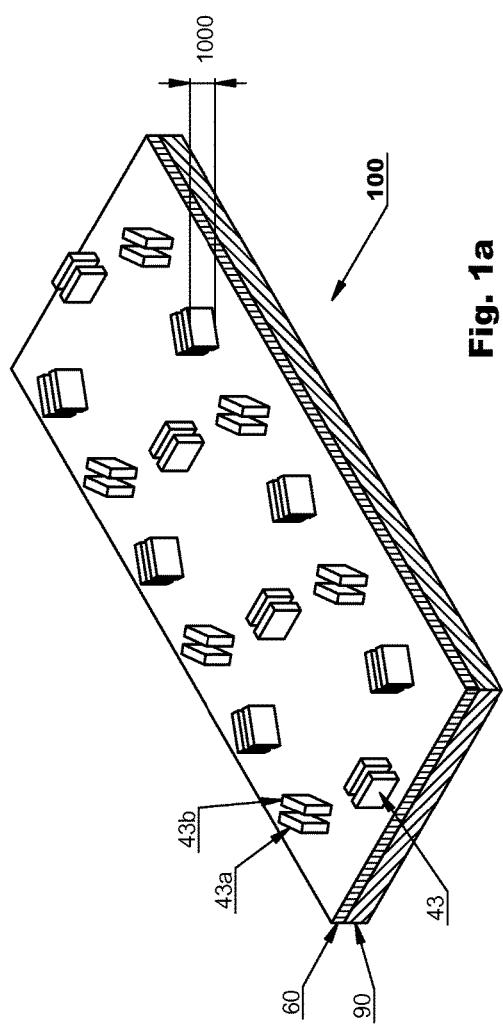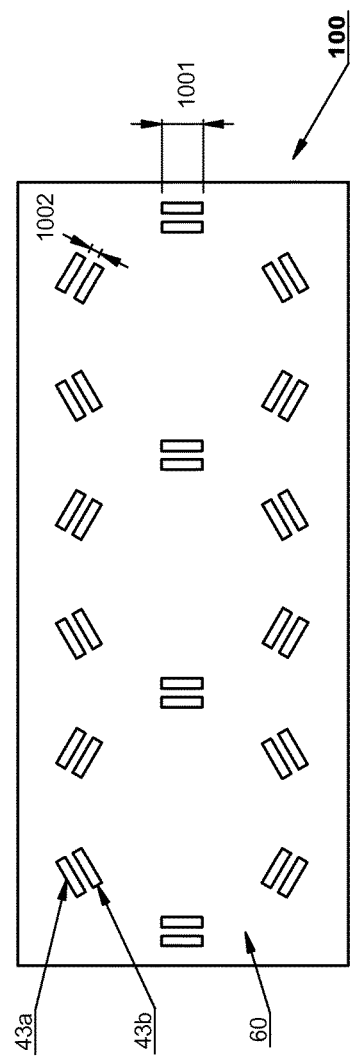

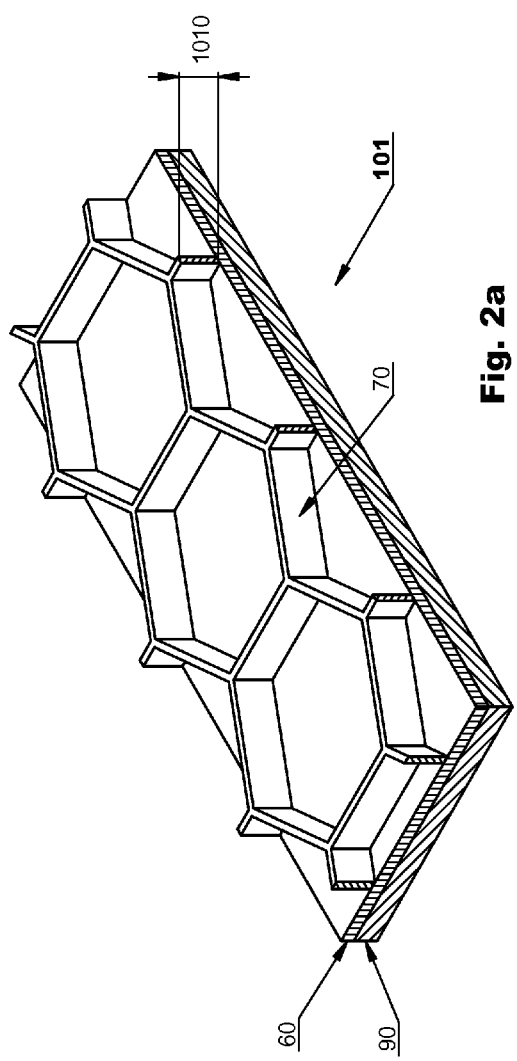
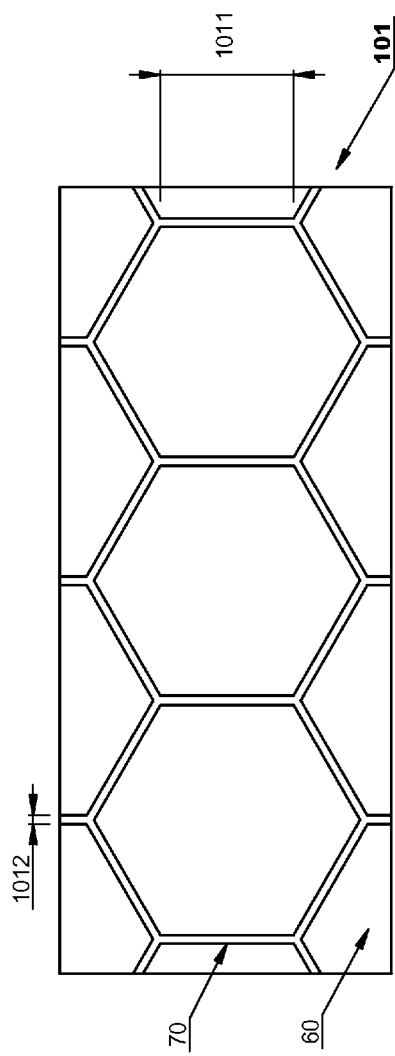
Fig. 2a
Fig. 2b

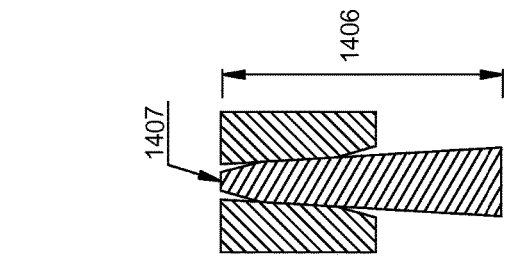
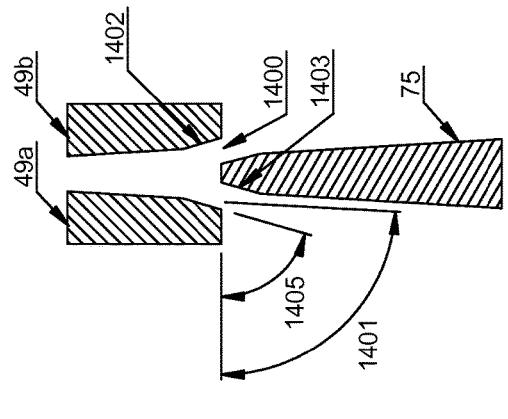
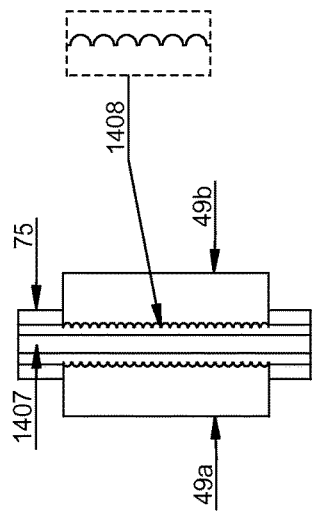
Fig. 14b
Fig. 14a
Fig. 14c
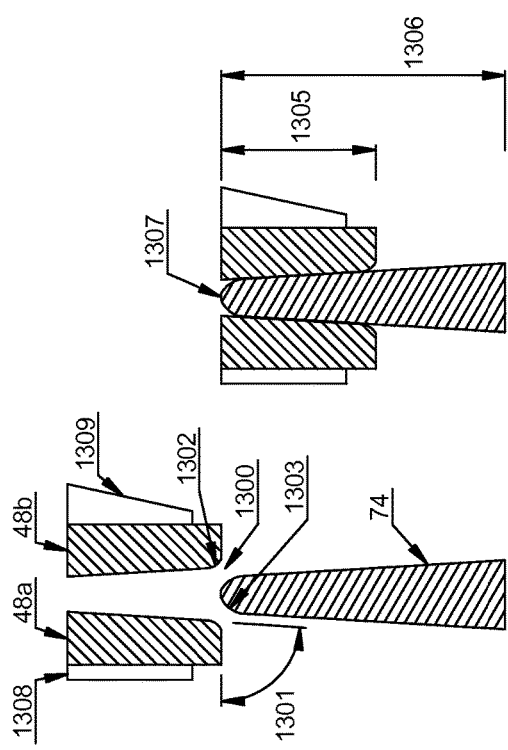
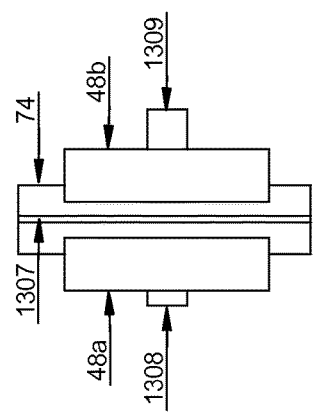
Fig. 13b
Fig. 13a
Fig. 13c

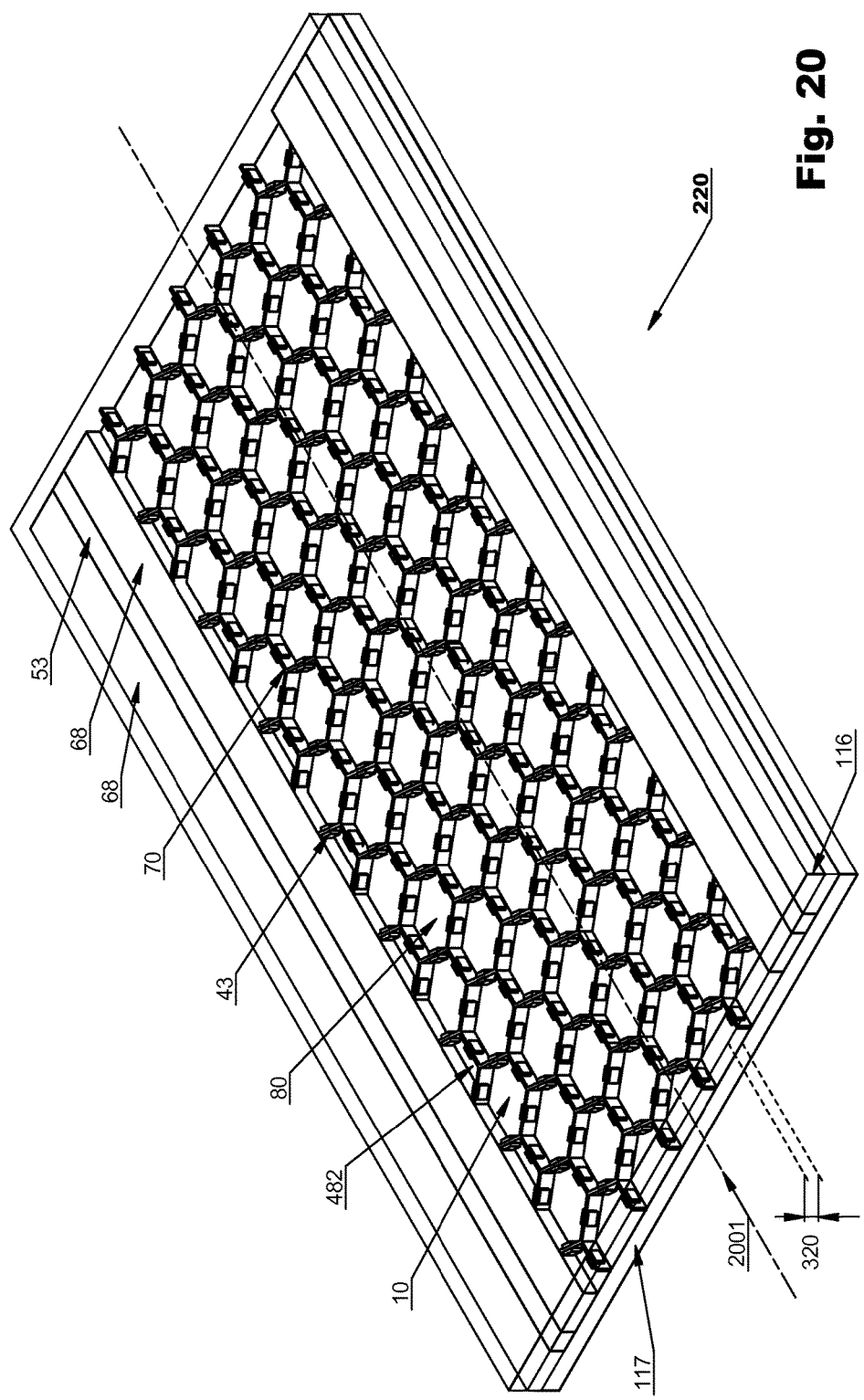

MICRO-FASTENED, SEALED LIGHT MODULATOR

This application is a 35 USC 371 national phase filing of PCT/EP2016/056225, filed Mar. 22, 2016, which claims priority to British Patent Application No. 1506147.6, filed Apr. 10, 2015, the disclosure of which are incorporated herein by reference in their entireties.

RELATED APPLICATIONS

The present application relates to WO/2014/146937 titled "An Electrophoretic Device Having a Transparent Light State" filed on 22 Mar. 2013 and to British Patent Application No. 1416385.1 titled "A Chiral Nematic Liquid Crystal Light Shutter" filed on 17 Sep. 2014, the disclosures of which are incorporated herein by reference in their entireties.

FIELD

The present invention relates to light modulator devices that have a fluid layer.

BACKGROUND TO THE INVENTION

There is a need for a rugged structure for large-area, flexible devices, in particular, for applications in switchable smart windows and outdoor information displays. In the prior art solutions include:
- dispersing fluid droplets (1 to 5 microns in diameter) in a continuous polymer matrix;
- microencapsulating fluid droplets and deforming them to form a monolayer of close packed polymer shells in a polymer matrix;
- forming a wall structure on one substrate, coating the tops of walls with adhesive, filling the cavities between the walls with fluid, and polymerizing the adhesive to bond the tops of walls to the opposing substrate; or,
- embossing a micro-cup structure onto one substrate, filling the cups with fluid having polymerizable components, and polymerizing to form a polymer skin on the fluid/cup surface.

The prior art solutions all impose limitations and have limited suitability, typically providing a solution for one specific fluid (e.g., liquid crystal (LC)) and one specific device type (e.g. switchable LC film). All of the above solutions expose the fluid to prepolymer components and a polymerization step. This forces compromises and adds complexity. For example, the fluid components must not participate in the polymerization and the prepolymer components must phase separate from the fluid on polymerization and somehow form solid polymer structure in defined areas (e.g. only on the fluid surface of a micro-cup). Furthermore, it is difficult to develop strong chemical bonds to the surface of substrates in the presence of a fluid because the fluid will preferentially wet the surface. As a consequence it is difficult to develop strong peel adhesion in prior art devices.

The present invention provides a large-area, flexible device that does not need to expose its fluid to a polymerization step and yet has polymer structure bonded to both substrates. As described in this document, the present invention also fulfils the need for devices to have large (≥50 micron axes), self-sealed, discrete fluid volumes together with strong peel adhesion.

SUMMARY OF THE INVENTION

A switchable light modulator device comprises a fluid layer disposed between opposite spaced apart major surfaces of first and second substrates, each of said substrates having first and second interoperable microstructures formed on said opposite major surfaces, said respective microstructures fitting together to join said first and second substrates and to define wall portions for a plurality of cavities, said cavities sealing said fluid in discrete volumes.

In embodiments said first and second microstructures are arranged to press fit together.

In embodiments said interoperable microstructures have a repeating pattern in one or both axes of said major surfaces.

In embodiments said microstructures of one pattern instance are interchangeable with those of another.

In embodiments said first and second microstructures are arranged to have (or their shapes provide) interference when press fitted. In embodiments where first or second microstructures provide an opening into which the other of the first or second microstructures are fitted, the interference fit lies in the range from 0.5% to 7.5% of the opening width or diameter, and preferably, from 1% to 5%, and more preferably, from 1.5% to 4.5%.

In embodiments said cavities' wall portions are under load (i.e. are under stress) established during press fitting, and cavities are characterized by a wall height that corresponds to the cell gap of said fluid layer and that is less than the wall height before said press fitting. In embodiments said loading reduces the height (orthogonal to said major faces of said substrate) of said wall portions by at least a factor of 0.99, preferably, 0.98, and most preferably, 0.975.

In embodiments said cavities' seals are between said wall portions and said major faces and/or between respective first and second wall portions on said first and second microstructures.

In embodiments, as a consequence of said wall loading, the sealed fluid inside a cavity enhances said wall loading, opposes relaxation of the loading over time, and resists external separating force applied to said substrates.

In embodiments one or both of said microstructures are arranged to elastically deform when fitting together.

In embodiments at said joint interface and said seal interface said fluid is substantially forced out by said press fitting.

In some embodiments a surface tension of said fluid is greater than a surface energy of the polymer of said microstructures ensuring that the fluid is a poor lubricant of said joints.

In embodiments said microstructures are arranged to swell in response to contact with said fluid to enhance said joining and sealing. Preferably said microstructures swell by 15% or less, more preferably, 10% or less, and most preferably, 7.5% or less.

In some embodiments said joining and sealing is enhanced by polymerization of said microstructures once joined, the polymerization providing covalent bonds in said joints and seals. Preferably the monomer conversion level in one or both microstructures is 90% or less before said joining, and more preferably, 75% or less, and most preferably, 66% or less.

In some embodiments said joining is enhanced by fusing said microstructures.

In embodiments joints between said microstructures are under load (i.e. are under stress) established during said press fit.

In embodiments said first and second substrates are micro-fastened to each other.

In embodiments said joints between said microstructures resist separation due to friction.

In embodiments said substrates resist separation due to the sum of counter forces comprising (but not limited to) friction provided by said joints, suction (i.e. pressure gradient between said fluid and the ambient pressure) provided by said loading of said cavities' wall portions, and the surface tension of said fluid and the adhesion of said fluid to the interface surfaces of said cavities.

In embodiments said joining and/or sealing is enhanced through chemical bonding including one or more of covalent bonds, ionic bonds, dipole-dipole interactions, London dispersion forces, and hydrogen bonds.

In some embodiments said joining and/or sealing is enhanced by entanglement of polymer strands at the respective interfaces.

In embodiments said joining and sealing provides said device with one or more of peel adhesion, tensile strength, shear strength, and resistance against failure due to fatigue or vibrations.

In embodiments said switchable light modulator device is arranged to selectively change one or more of: light attenuation, colour, or specular transmittance in response to electrical, optical or thermal changes and switches to provide two or more light states.

In embodiments said microstructures extend from said opposite surfaces of said substrates into said fluid layer and are embedded within a viewing area of said device to divide said fluid into a monolayer of said discrete volumes.

In embodiments said microstructures are invisible by eye in said viewing area.

In embodiments one or both of said microstructures comprise wall portions.

In embodiments said microstructures include a micro-fastening part (micro-fastener) and an interoperable wall part.

In some embodiments said micro-fastening part can be separate from said wall part so that it is present within said discrete volumes.

In embodiments said joints are permanently joined.

In embodiments said fluid is in contact with said opposing major surfaces of said first and second substrates.

In some embodiments said micro-fasteners provide a hard stop defining said wall loading and until the hard stop is reached an excess of said fluid is forced from said cavities including through one or more openings at the micro-fasteners. Preferably, the height of said hard stop micro-fasteners is less than the height of said wall portions before said press fit.

In some embodiments said first and second microstructures fit together forming triple-skinned wall portions for said cavities, and one or both microstructures have channels (or openings) to ensure an excess of said fluid is forced from said cavities during said press fitting.

In some embodiments said microstructures are integrally moulded with said substrate (i.e. are a single or homogeneous entity).

In some embodiments said first and second substrates have electrode layers that are used to apply an electrical field to said fluid layer, and said fluid has contact with said electrodes. In alternative embodiments said fluid has contact with a dielectric layer that overlays said electrodes. In other alternative embodiments said fluid has contact with an electrochromic layer and/or an ion storage layer that overlays said electrodes.

In some embodiments the polymer of one or both said microstructures is conductive and the microstructure functions as an electrode within said device.

In embodiments at least one of said substrates comprises a flexible material.

In embodiments said microstructures comprise one or more solid polymers.

In embodiments said first microstructures comprise a more rigid polymer than used in said second microstructures.

In embodiments said joints are deformable.

In some embodiments said second microstructures include said wall structures and comprise an elastomeric solid polymer characterized by a glass transition temperature (i.e. Tg) less than 20 degrees Celsius (i.e. 293K) and possessing crosslinks.

In embodiments said microstructures and said substrates have sufficient flexibility to allow said device to conform to the curvature of a cylinder of radius 300 mm, and preferably, radius 100 mm, and most preferably, radius 50 mm.

In some embodiments said joining and sealing is enhanced by subjecting said device to more than one press fit event.

In some embodiments said sealing is enhanced by a sealing gel material located about a sealing plane of said mechanical seal, said sealing gel being insoluble in said fluid.

In some embodiments said sealing is enhanced by a polymerized flexible adhesive located about a sealing plane of said mechanical seal.

In some embodiments said joints are enhanced by polymerized flexible adhesive located at or about said joints, and said adhesive enhances the resistance of said joints to external shocks and vibrations.

In some embodiments a minority of microstructures are present to align said first and second substrates and these have a greater engagement length (i.e. extend further into the fluid layer) than the majority.

In some embodiments said microstructures from a quasi-random pattern on said substrates.

In some embodiments said quasi-random pattern repeats over a fixed distance across the viewing face of said device. In alternative embodiments said quasi-random pattern is embedded in a grid pattern across said viewing face.

In some embodiments said device has an additional mechanical seal and joints about the periphery of the viewing area, said additional mechanical seal comprising wider microstructures than used within the viewing area, and preferable sufficiently wide to be visible by eye.

In embodiments said microstructures are arranged to ensure that on joining said substrates, said fluid is pushed out of said joints to allow the microstructures to seat correctly.

In embodiments said microstructures are arranged to ensure that said fluid can flow sufficiently to divide and seal into discrete volumes with the microstructures seating correctly and establishing a uniform cell gap.

In some embodiments the joined microstructures are the result of said joining being done by laminating said substrates and fluid between a pair of NIP rollers.

In embodiments, each of first and second interoperating microstructures comprise: a plate and a wall, an arm and a wall, a post and a discontinuous hole, a post and a wall, a post and a discontinuous annulus (tube), a discontinuous annulus plug and corresponding discontinuous annulus and post, a cantilever and a mating discontinuous recess, or a key and a slot.

In some embodiments said microstructures comprise strengthening flanges, ribs or braces.

In some embodiments said microstructures comprise filleted or chamfered heads.

In some embodiments a head of said microstructures is thinner than a base by at least a factor of 0.85, preferably, 0.66, more preferably, 0.5, and most preferably, 0.33.

In some embodiments said first and second microstructures both comprise wall portions and the wall portions extend less than a cell gap into said fluid layer, and the seal is formed by contact of respective heads (of wall portions) with each other and is offset from both said major surfaces.

In embodiments an engagement length along a length of interoperating first and second microstructures is from one tenth to ten tenths of the cell gap of said fluid layer.

In some embodiments joining surfaces of said microstructures are serrated or roughened.

In some embodiments said microstructures mate with a snap fit and the shape of said microstructures are characterized by undercuts.

In some embodiments the polymer of the first and/or second microstructures has black colourant and the microstructures strongly attenuate light.

In some embodiments the polymer of the first and/or second microstructures has filler material to enhance the strength and the rigidity of said walls and/or micro-fasteners.

In some embodiments the refractive index of said microstructures matches that of said fluid, preferably to within 0.02 of each other, more preferably, 0.005, and most preferably, 0.002.

In some embodiments said device is cut from a continuous film of said device.

In alternative embodiments said substrates are cut from respective continuous films before assembling said device.

In some embodiments said substrates are made of the same materials (i.e. matched) and preferably said substrates comprise side-by-side strips slit from a wider film.

In embodiments said switchable light modulator device is one of the following types, or hybrid versions thereof: an electrophoretic device, a liquid crystal device, a suspended particle device, an electro-wetting device, an electrokinetic device, an electrochromic device incorporating an electrolytic fluid gel, a thermochromic device, or a photochromic device.

In some embodiments said device is incorporated into a window as a layer within a glass laminate or alternatively it is bonded to a glass pane. In alternative embodiments said device is a light shutter, a light attenuator, a variable light transmittance sheet, a variable light absorptance sheet, a variable light reflectance sheet, an electronic skin, a monochrome display, a colour display, or a see-through display.

In some embodiments said device's joined substrates required lamination of the substrates under tension.

In some embodiments said device's substrates are flexible glass having a thickness less than 200 microns.

BRIEF DESCRIPTION OF THE DRAWINGS

Embodiments of the invention will now be described, by way of example, with reference to the accompanying drawings, in which:

FIG. 1A shows an isometric projection of a first substrate 100 and first microstructures 43(a, b).

FIG. 1B shows a face view of FIG. 1A.

FIG. 2A shows an isometric projection of a second substrate 101 and second microstructure 70.

FIG. 2B shows a face view of FIG. 2A.

FIG. 13a is a sectional view showing first microstructures 48(a, b) and second microstructure 74 before they are joined in an embodiment.

FIG. 13b is a sectional view showing the microstructures of FIG. 13A joined in an embodiment.

FIG. 13c is a face view of FIG. 13b.

FIG. 14a is a sectional view showing first microstructures 49(a, b) and second microstructure 75 before they are joined in an embodiment.

FIG. 14b is a sectional view showing the microstructures of FIG. 14A joined in an embodiment.

FIG. 14c is a face view of FIG. 14b.

FIG. 20 shows an isometric projection of embodiment 220. Film device 220 has aligning microstructures 53 and 68 adjacent its long edges.

DETAILED DESCRIPTION

Figure 3:
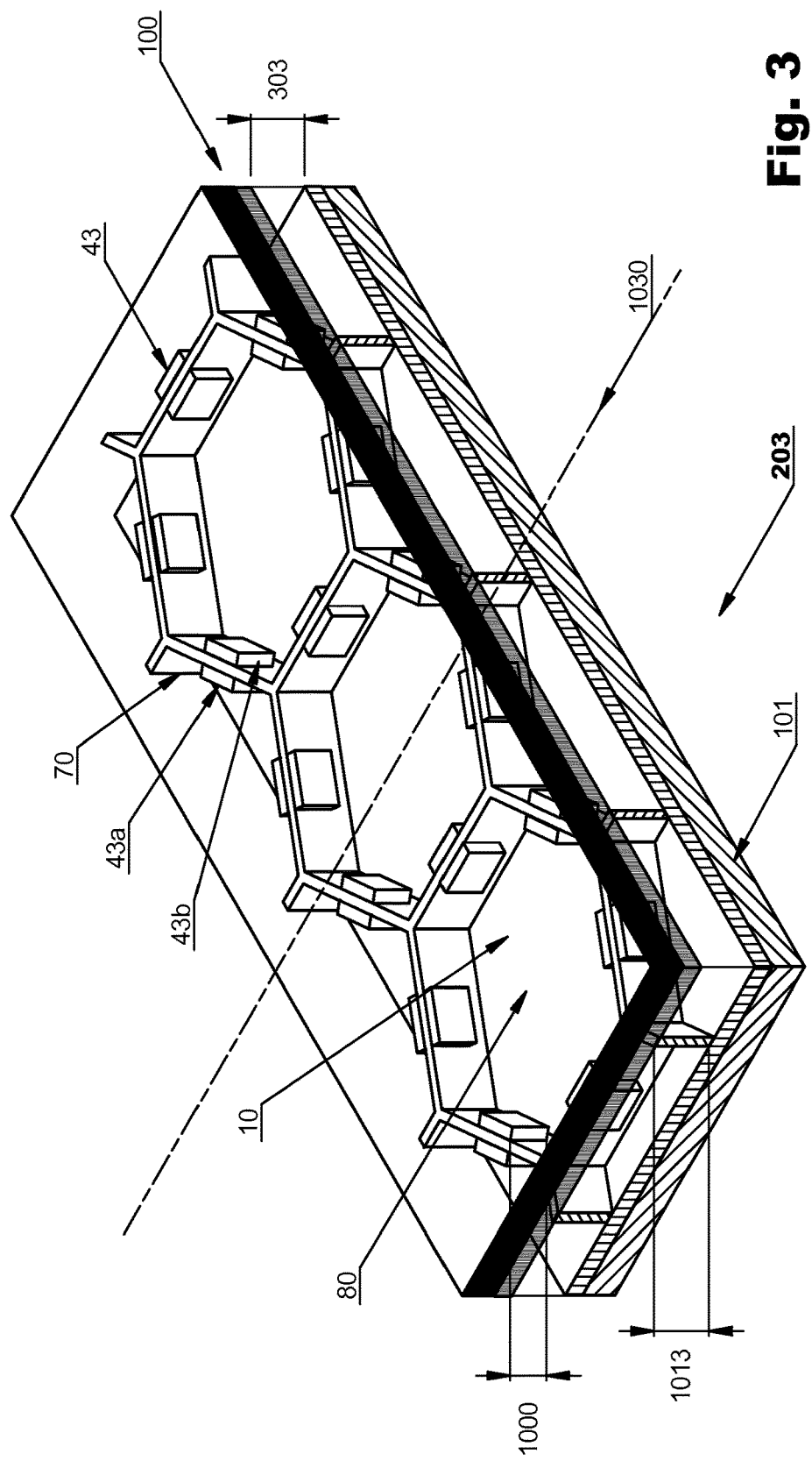
FIG. 3 shows an isometric projection of embodiment 203 including fluid layer 303, sealed fluid cavities 80, and substrate 100 joined to substrate 101.

Embodiments of the present invention provide a switchable light modulator with a fluid layer. The device has solid polymer structures embedded in its viewing area and the structures are on the scale of microstructure and are invisible to the eye. There are microstructures on both substrates. They join the substrates of the device to each other, and, incorporate a wall structure that divides the device's fluid layer into a monolayer of discrete volumes contained within corresponding cavities. The microstructures are joined in a press fit that also seals the cavities. Advantageously, this provides the device with significant structural strength including peel adhesion, tensile strength, tear strength, and resistance against failure due to fatigue or vibrations.

The light modulator selectively changes one or more of light attenuation, colour, or specular transmittance in response to electrical, optical or thermal changes and switches providing two or more light states. An important application for embodiments is in smart windows. The device can be incorporated into a window as a layer within a glass laminate or alternatively it can be in the form of a flexible device bonded to a glass pane. Both smart window applications require a film device to have significant structural strength and also to have the fluid layer compartmentalized with each discrete fluid volume self-sealed. The demands on structural strength include that necessary to withstand the glass lamination or bonding process, resistance to the loads encountered when handling and installing large smart windows, and resistance to loads placed on the device over its life by environmental shocks such as wind and temperature extremes. Furthermore, in transport applications the device's structure has to be resistant to vibrations.

Other embodiments for the device include use as a light shutter, a light attenuator, a variable light transmittance sheet, a variable light absorptance sheet, a variable light reflectance sheet, an electronic skin, a monochrome display, a colour display, or a see-through display. Advantageously, embodiments are particularly suited to applications that require a large area such as from $0.25M^2$ to $5M^2$. Furthermore, a device that is a roll of film (e.g. embodiment 220 in FIG. 20) can have an area of $1,000M^2$ or more.

In embodiments the fluid layer is sandwiched between aligned first and second substrates and is in contact with the juxtaposed parallel spaced apart major surfaces of both. Each substrate has respective first and second microstructures and these fit together (synonymous with mate) joining the first and second substrates while simultaneously dividing the fluid layer into a monolayer of discrete volumes and sealing the volumes so that they are isolated from each other. The joining function of the microstructures is provided by interoperable micro-fasteners (also spelt as microfasteners) and the dividing and sealing is provided by wall structures. In this document interoperable micro-fasteners means microstructures on opposing substrates that are aligned and fit together. The mated microstructures in an embodiment integrate a micro-fastening part and function with a wall part and function to mechanically secure the top and bottom substrates to each other while compressing the wall structures to made a seal. Preferably the microstructures are made by micro-replicating the surface of a tool onto its respective substrate. For example, by embossing or moulding methods.

The microstructures are a press fit, with the joints providing significant friction there between. As described later, the mated microstructures maximise friction by providing interference. A press fit is also known as an interference fit or a friction fit. In embodiments one or both microstructures elastically deform while mating, and preferably the polymer of one microstructure is more rigid than the other. As a consequence of the press fit, the joints and seals of a device are under load (i.e. under stress).

The loading (i.e. interference fit) of joints develops part of the total friction, another contributing part is chemical bonds across the joint interface including one or more of covalent bonds, ionic bonds, dipole-dipole interactions, London dispersion forces, and hydrogen bonds. Surface roughness and entanglement of polymer strands at the joint interface also contribute to friction.

The friction provided by joints is increased by the fluid swelling one or both microstructures over time effectively increasing the interference fit (or loading). This favourable increase in the interference fit over time due to swelling by the fluid counteracts the effects of thermal cycling and loading relaxation over time. Preferably swelling is limited through selection of the fluid and polymer to be 15% or less, more preferably, 10% or less, and most preferably, 7.5% or less.

While the low level of swelling described is beneficial it is important for the loading of joints and seals in the press fit that the fluid is forced from these areas and doesn't act as a lubricant, particularly within a joint. In some embodiments, the surface tension of the fluid is greater than the surface energy of the polymer used in the microstructures so that the fluid doesn't wet the solid polymer surface and can easily be forced from the interface area of joints and seals when press fitting. For example, fluorinated polymers generally have a low surface energy, less than the surface tension of fluids common to light modulators. Background on the swelling of polymers by fluids and the advantages of fluorosilicone elastomeric polymer are described in the applicant's patent application PCT/EP2014/072241.

In some embodiments the joints and seals benefit from completing the polymerization of the microstructures after press fitting. The intimate contact of the interface areas of the joints and seals (after the fluid has been forced out by press fitting) allows covalent bonding across the interfaces. By controlling the monomer (or prepolymer) conversion level ahead of mating the device's substrates the incidence of covalent bonds formed in situ can be selected. In embodiments the monomer conversion level is 90% or less before mating, and more preferably, 75% or less, and most preferably, 66% or less.

In some embodiments the joints benefit from more than one press fitting event. For example, an embodiment can be made by laminating its substrates between NIP rollers, a first press fitting event, and subsequently subjected to atmospheric pressure during glass lamination, a second press fit event. Other ways to enhance the peel adhesion of the joints are described later.

Up to now the resistance to separation of the device's substrates has been described in relation to the microstructure joints. But in embodiments the fluid also contributes to separation resistance (i.e. peel adhesion) because it is in contact with both substrates and must be sheared, and suction overcome, for substrate separation to occur. The surface tension of the fluid and the adhesion of the fluid to both substrates can provide significant counter forces, particularly if the separation force is applied away from an edge area, or, through rigid substrates such as glass panes in a glass laminate embodiment. Furthermore, as described in the following, the sealed fluid inside cavities uses suction to counter externally applied separating force.

In embodiments the shape, arrangement, interoperability and polymer selection of the microstructures on the first and second substrates are central to how the fluid layer is made:

firstly, the micro-fasteners of the first and second microstructures are discontinuous or open so that the fluid is channelled out of joints allowing the microstructures to correctly seat when press fitted;

secondly, the walls and/or the micro-fasteners divide the fluid layer into a monolayer of fluid cavities having a uniform cell gap as the microstructures are press fitted;

thirdly, once press fitted the walls of the first and second microstructures together with the micro-fasteners and the top and bottom substrates' juxtaposed parallel spaced apart major surfaces, provide sealable cavities for the fluid inside each;

fourthly, on press fitting the first and second microstructures together at the NIP point of laminating rollers excess fluid flows away from the NIP point to the unlaminated side, or can be forced to flow by the pressure applied during laminating, so that after passing the NIP point the fluid layer has a uniform cell gap and the micro-fasteners and walls are correctly seated;

fifthly, on press fitting the micro-fastener joints the wall are also loaded (or held under stress) to seal the fluid inside cavities;

sixthly, loading the walls of cavities (by press fitting) slightly reduces the wall height with a corresponding reduction in the fluid volume inside cavities when compared with the volume inside a cavity having unloaded walls, in consequence the sealed fluid inside a cavity experiences a slight suction (or slightly lower pressure than atmospheric pressure) that affirms the wall loading, opposes relaxation of the loading over time, and resists external separating force;

seventhly, in some embodiments the micro-fasteners provide a hard stop defining a wall loading and until the hard stop is reached (and as a consequence the cavity sealed) excess fluid is forced from a cavity through one or more openings at its micro-fasteners.

The embodiments shown in the figures meet the requirements as described up to now. FIG. 1a shows an isometric projection of a section of the first substrate 100 of embodiment 203 (see FIG. 3). The view is shown face-up while in FIG. 3 substrate 100 is face down. Electrode 60 is formed on a carrier substrate 90. The first microstructures 43(a, b) are formed on substrate 100. They comprise micro-fasteners 43a and 43b and are in the shape of plates. Microstructures 43(a, b) are dispersed across the face of substrate 100. Dimension 1000 indicates the height of the microstructures 43(a, b) orthogonal to a major face of substrate 100. FIG. 1b is the corresponding face view of substrate 100. It shows that microstructures 43(a, b) are arranged in a hexagonal grid. Dimension 1001 is the width of a micro-fastener 43(a, b), and dimension 1002 is the spacing apart of 43a and 43b from each other.

FIG. 2a shows an isometric projection of a section of the second substrate 101 of embodiment 203 (see FIG. 3), and the view corresponds to how it is shown in FIG. 3. Electrode 60 is formed on a carrier substrate 90. The second microstructure 70 is a wall structure and is formed on substrate 101. Dimension 1010 indicates the height of the microstructure 70 orthogonal to a major face of substrate 100. FIG. 1b is the corresponding face view of substrate 101. It shows that microstructure 70 is in the shape of a hexagonal grid. Dimension 1011 is the length of a wall side, and dimension 1012 is its width.

Figure 18:
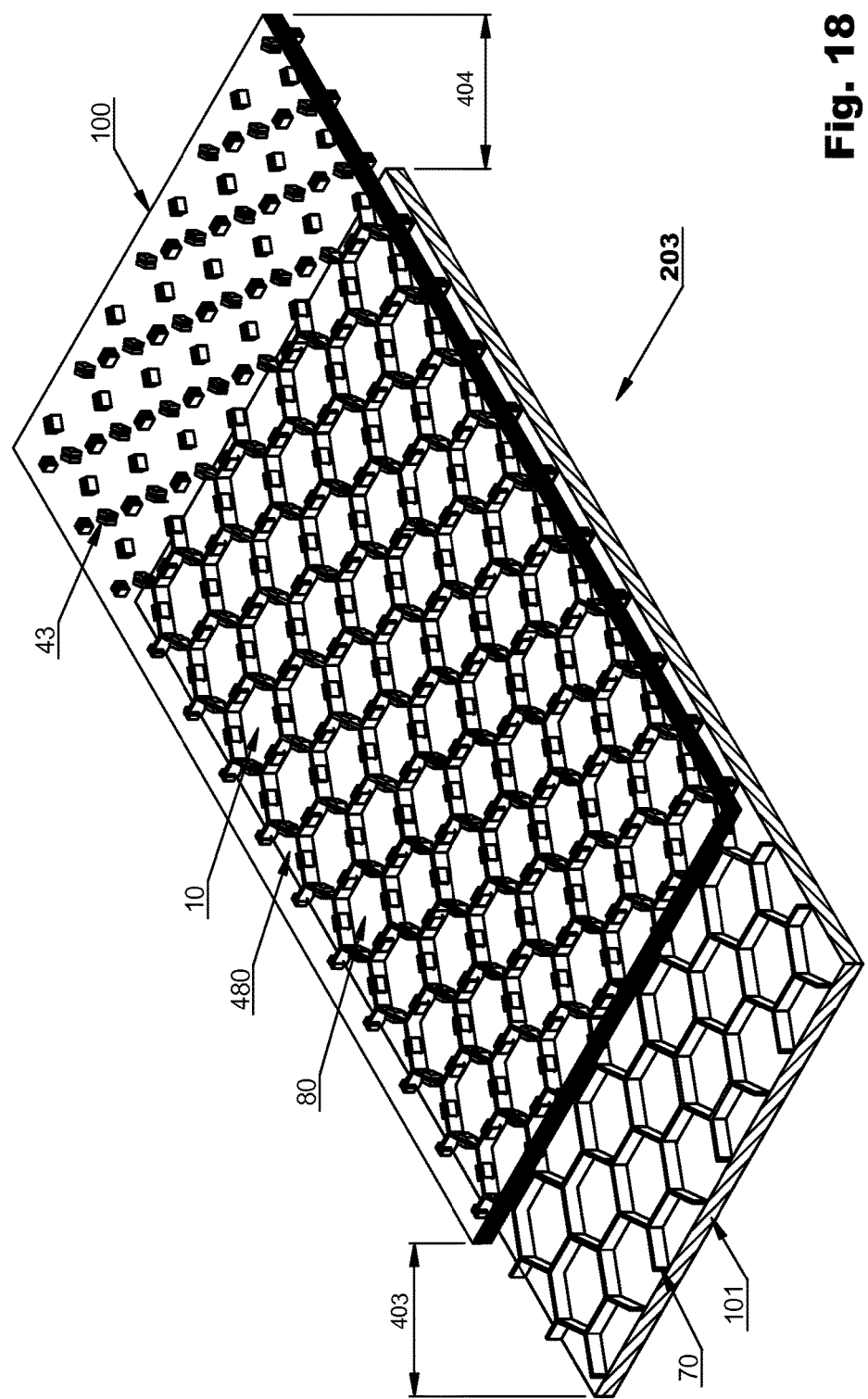
FIG. 18 shows another isometric projection of embodiment 203 (see FIG. 3) including electrical connection ledges 403 and 404.

FIG. 3 shows an isometric projection of a section of embodiment 203. Just three complete fluid cavities 80 are shown with the section cutting through adjacent cavities and the fluid 10 within these cavities. The section through fluid 10 is not shown with hatched lined but the presence of fluid is generally indicated by arrow 10. FIG. 3 corresponds to a local area (or section) of a much larger device and FIG. 18 shows the same embodiment 203 as it would appear with connection ledges 403 and 404 and sides. Neither drawing is to scale. In embodiments the pitch of cavities 80 (or the fluid volumes defined thereby) is from 50 microns to 1,000 microns. For example, a smart glass device with a pitch of 250 microns would typically have between 2,000 and 6,000 discrete fluid cavities across its face and from 2,000 to 20,000 along its face, or a total number of cavities of between 4 million and 120 million. The fluid layer 303 is drawn as if it was the top face and the outline of the first substrate 100 overlays this view. The embodiments that follow are drawn similarly and correspond to magnified views of local areas (or sections) of much larger devices.

In embodiments the dimensions of the micro-fastening portion of microstructures in the X and Y axes of a face view are less than the resolution of a viewer. The maximum angle subtended by a micro-fastener portion to a viewer at a required viewing distance is one arcminute (corresponding to 290 microns at a viewing distance of 1 meter) and preferably 0.6 arcminutes (corresponding to 174.5 microns at 1 meter). The maximum subtended angle of cavities (i.e. the pitch) is double these limits. The thickness of the majority of wall and micro-fastener sections embedded in the viewing area is from 3 microns to 75 microns, more preferably, from 5 microns to 40 microns, and most preferably, from 6 microns to 35 microns.

In FIG. 3 the device's fluid layer 303 is indicated as being between the arrows shown and forms an interface with the electrodes 60 of substrates 100 and 101 (see also FIGS. 1a to 2b). The cell gap 1013 corresponds to the orthogonal distance between the respective interfaces of fluid layer 303 with the first and second substrates. Fluid 10 is divided into discrete fluid volumes by wall microstructure 70 with each fluid volume being defined by a cavity 80. The fluid cavities 80 are side-by-side in a hexagonal grid and are in a monolayer. Substrates 100 and 101 are joined by the mating of micro-fasteners 43(a, b) with wall microstructure 70. Cavities 80, and the fluid 10 within, are sealed by wall 70 pressing against the face of electrode 60 on substrate 100. Micro-fasteners 43(a, b) are a press fit to wall microstructure 70. The fit has interference because the distance 1002 between micro-fasteners 43a and 43b (see FIG. 1b) is less than the width 1012 of wall structure 70 (see FIG. 2b). The microstructures engage for a length 1000 (in the direction orthogonal to the opposing faces of the substrates) and engage for a width 1001, corresponding to the dimensions of the micro-fasteners 43(a, b). In embodiments the engagement length 1000 is less than or equal to the cell gap 1013. In FIG. 3 a micro-fastener 43 is shown at each side of wall 70, or six per hexagonal cavity, but in related embodiments there can be any number of micro-fasteners per cavity including none in a cavity that is adjacent another with micro-fasteners.

In device 203 the cell gap 1013 is less than or equal to the wall height 1010 of the second microstructure 70 (see FIG. 2a). Advantageously in some embodiments fluid 10 is under suction within cavities 80 because the walls 70 are under load and slightly deformed resulting in a reduced cell gap and wall height within devices. In this document a fluid under suction refers to a fluid that is at a lower pressure to the atmospheric pressure of surroundings. In these embodiments the wall loading and slight fluid suction are effective to seal fluid 10 within cavities. In alternative embodiments fluid 10 is sealed within cavities using a sealing gel or sealing adhesive located at the top of walls 70. In such embodiments the wall height 1010 (FIG. 2a) is equal to the cell gap 1013 and the fluid 10 is not under suction in sealed cavities 80. These latter embodiments are described further in relation to FIGS. 15a, 15b and 15c.

Embodiment 203 was laminated between a pair of NIP rollers. In some embodiments during lamination the substrates are held under tension by unwinder and/or rewinder stations or modules as part of a roll-to-roll system. Prior to starting lamination the microstructures 43a, 43b and 70 of the respective substrates 100 and 101 are aligned in a leading edge area and the NIP rollers closed in this leading area and the substrates tensioned. The fluid to be laminated is then introduced between the substrates forming a reservoir before passing through the NIP rollers (this is described in more detail later). The preferred direction of lamination with respect to the orientation of the hexagonal cavities is indicated by arrow 1030. In this orientation fluid 10 does not experience cavity walls that are parallel to the NIP point of the laminating rollers (i.e. parallel to the rollers) making it easier to force excess fluid from a cavity as the device passes the NIP point and the micro-fasteners and walls are seated.

Figure 4:
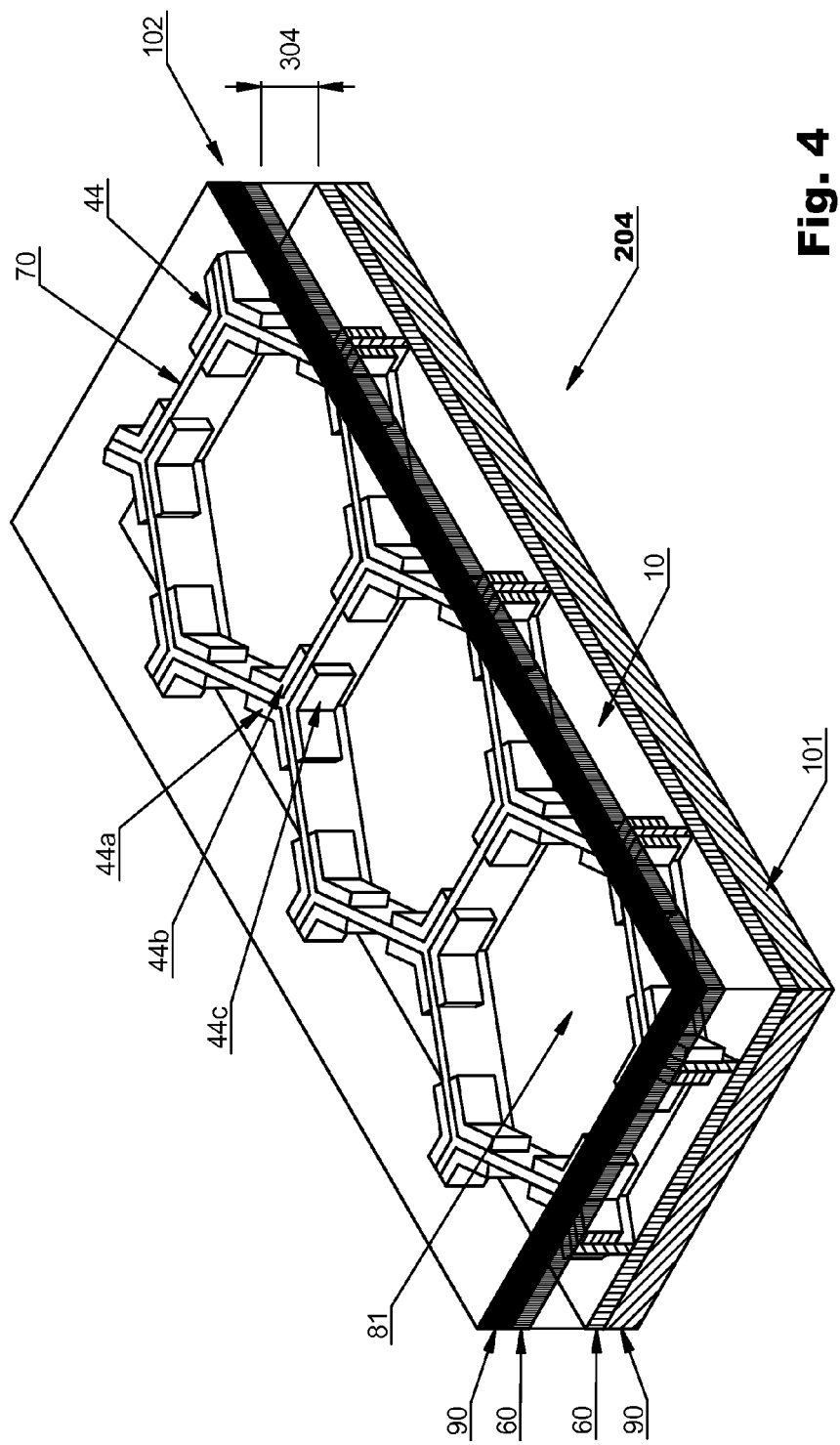
FIG. 4 shows an isometric projection of embodiment 204 including fluid layer 304, sealed fluid cavities 81, and first microstructures 44(a, b, c) joined to second microstructure 70.

Embodiment 204 is shown in FIG. 4 and it is similar to embodiment 203. Its second substrate 101 was described earlier in relation to FIGS. 2a and 2b. First substrate 102 has first microstructures 44(a, b, c) formed on its electrode surface 60. The indicated micro-fasteners 44a, 44b and 44c are shaped to fit the vertices of the hexagonal walls 70. In the fluid layer 304 the fluid 10 is divided into discrete volumes corresponding to cavities 81. In FIG. 4 a micro-fastener 44 is shown at each vertex of wall 70, or six per hexagonal cavity, but in related embodiments there is only one micro-fastener 44 per wall intersection (or two per cavity).

In a further embodiment not shown a first substrate can have both micro-fasteners 43 and 44 provided that both are spaced apart from each other sufficiently to provide a channel or opening for excess fluid 10 to flow while the substrates are joined and a cavity's seal is established by press fitting during lamination. In such embodiments said micro-fasteners 43 and 44 form a triple-skin (or wall) for its cavities. It will be appreciated that if the walls of a triple-skinned cavity were continuous in the first and second microstructures then excess fluid would be trapped as the substrates are brought together and the heads of walls overlap, and the trapped excess fluid would prevent the microstructures joining and sealing correctly.

Figure 5:
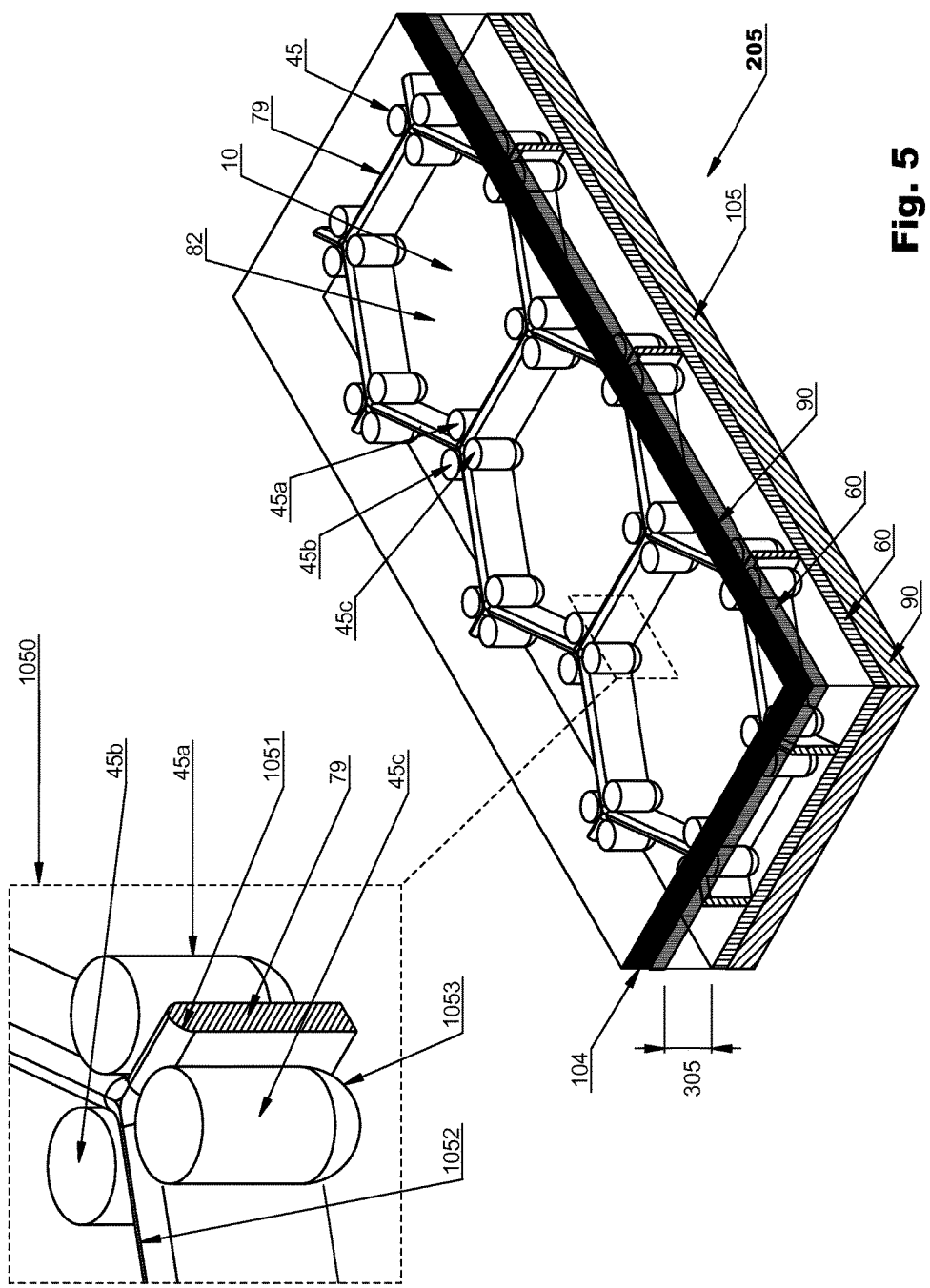
FIG. 5 shows an isometric projection of embodiment 205 including fluid layer 305, sealed fluid cavities 82, and first microstructures 45(a, b, c) joined to second microstructure 79.

FIG. 5 shows embodiment 205. Second substrate 105 has a hexagonal microstructure 79 formed on its electrode surface 60 similar to structure 70 in FIGS. 2a and 2b. First substrate 104 has first microstructures 45(a, b, c) formed on its electrode surface 60. The indicated micro-fasteners 45a, 45b and 45c are posts and on aligning both substrates press against walls 79 at its vertices. In the fluid layer 305 the fluid 10 is divided into discrete volumes corresponding to cavities 82. In FIG. 5 a micro-fastener 45 is shown at each vertex of wall 70, or six per hexagonal cavity, but in related embodiments there can be any number of posts 45 per hexagonal cavity and posts 45 can be located along walls similar to micro-fasteners 43 in FIG. 3.

The magnified section view 1050 shows that posts 45 have a dome shaped head indicated by 1053 and walls 79 have a filleted head indicated by 1051. The curved head surface of both mating microstructures eases their coming together during lamination. The top of walls 79 is indicated by 1052 and can be a planar or curved surface. In embodiments the contact of surface 1052 with the first substrate 104 must be continuous to seal a cavity 82. In some embodiments the head of microstructures facilitates their loading when pressed together as the differently shaped head has less material (and so is less rigid) than the bodies of the microstructures.

Figure 6:
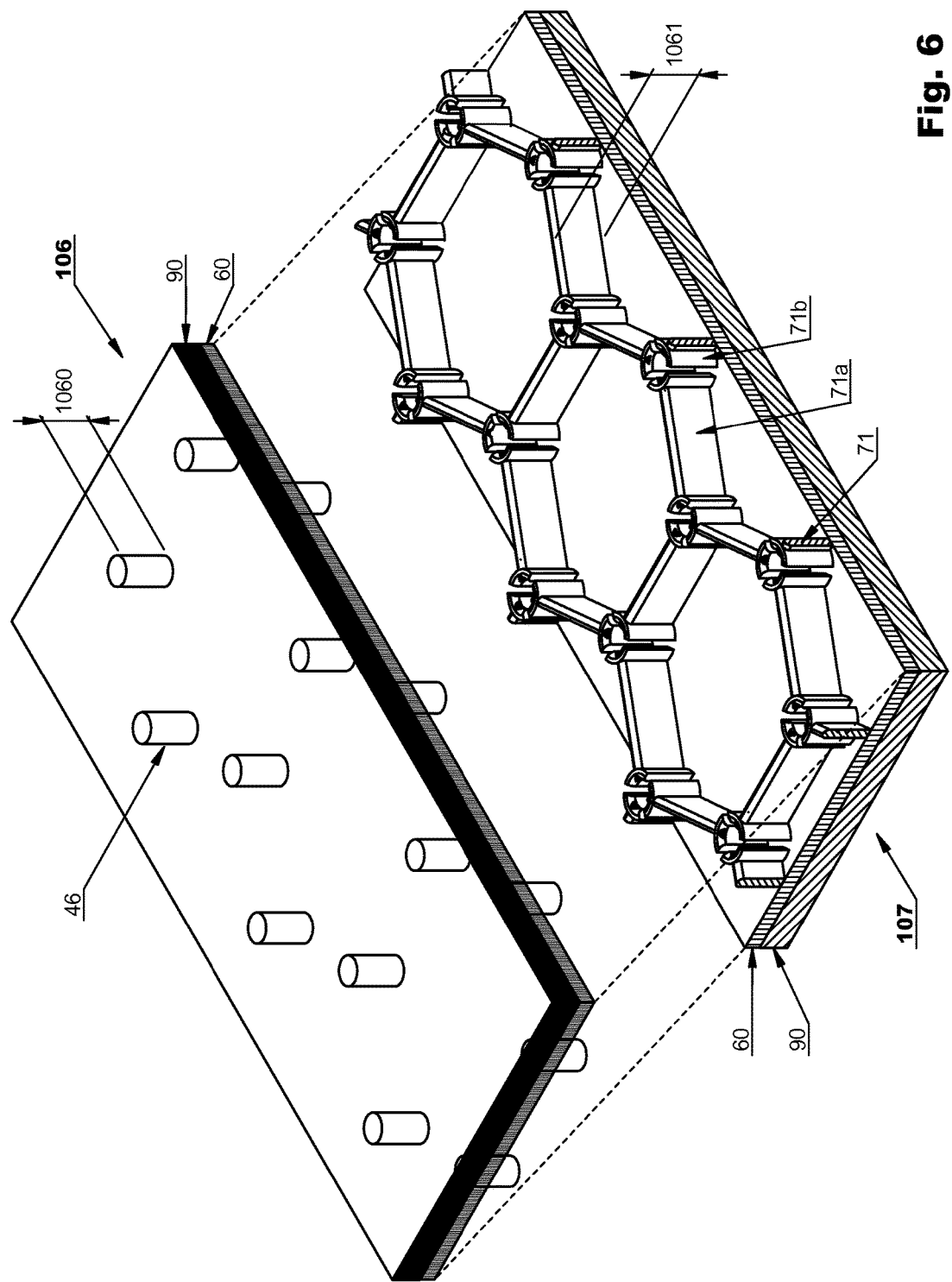
FIG. 6 shows an isometric projection of first substrate 106 (including first microstructures 46) and second substrate 107 (including second microstructures 71(a, b)).
Figure 7:
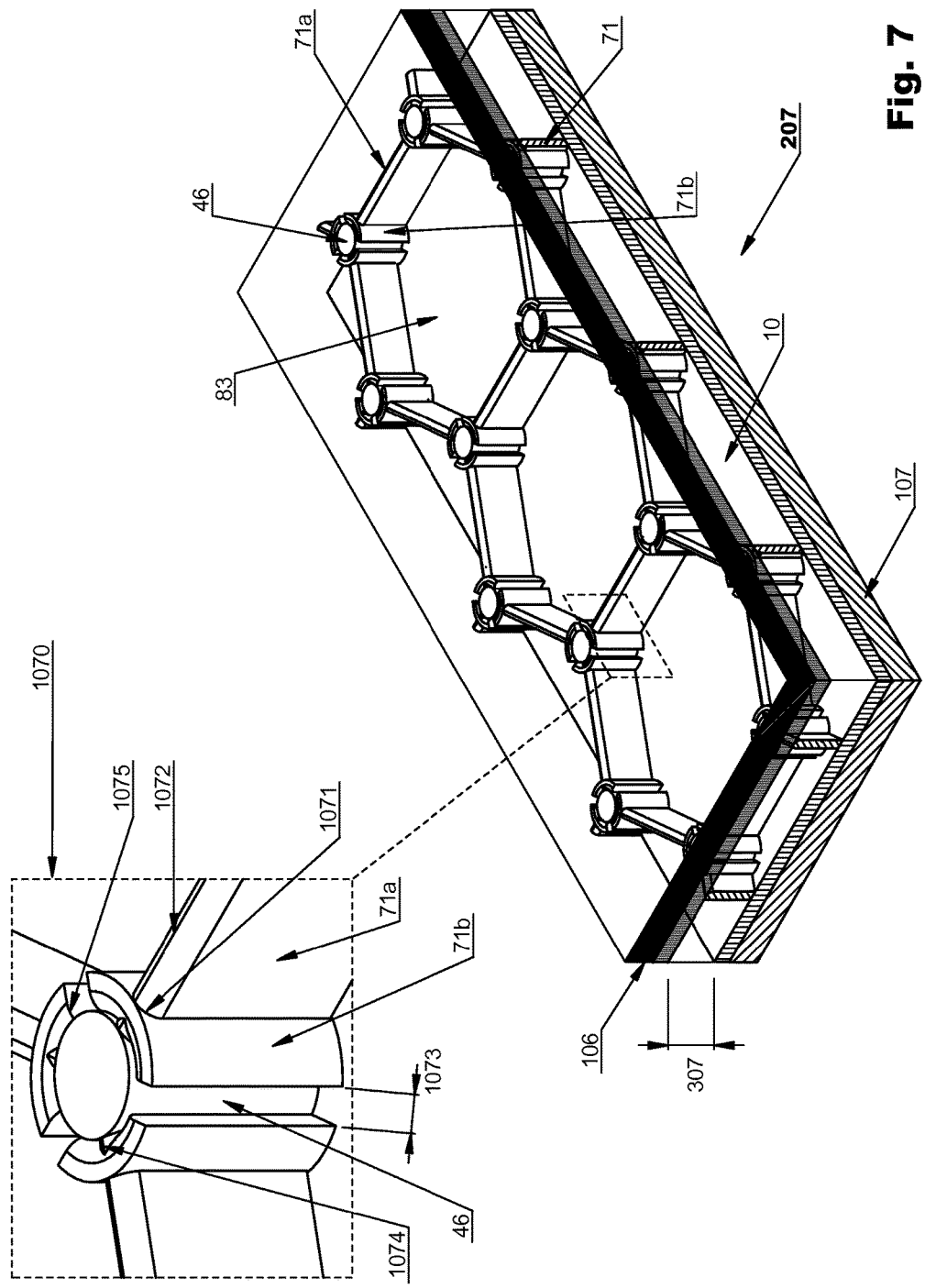
FIG. 7 shows an isometric projection of embodiment 207 including fluid layer 307, sealed fluid cavities 83, and substrate 106 joined to substrate 107.

FIG. 6 shows substrates 106 and 107 offset from each other, aligned, and before joining in a device. FIG. 7 shows these substrates press fitted together in embodiment 207. The first substrate 106 is shown face-down and has first microstructures 46 formed on its electrode surface 60. The second substrate 107 has a hexagonal microstructure 71 comprising wall portions 71a and annulus shaped portions 71b formed on its electrode surface 60. The indicated micro-fasteners 46 are posts and are in a pattern corresponding to the hexagonal grid of microstructure 71. Micro-fasteners 46 press fit into discontinuous annuluses 71b at the vertices of the hexagonal microstructure 71. Unlike previous embodiments the second microstructure 71 is discontinuous and is open at its vertices. The magnified view 1070 in FIG. 7 shows a vertex of microstructure 71 together with mated microstructure 46. Without the latter (i.e. 46) slots 1073 in the annuluses 71b open the three adjoining cavities 83 at their shaped vertex. In the absence of a correctly seated micro-fastener 46, fluid 10 in each of the three cavities 83 is not isolated, and fluid from one cavity can be channelled to either or both adjoining cavities at a vertex of microstructure 71. This latter point is expanded on later in relation to FIGS. 7 and 11.

Dimension 1060 is the height of posts 46 and in some embodiments corresponds to the height of a hard stop (provided by posts 46). Dimension 1061 is the height of microstructure 71. In those embodiments where the walls are not loaded during press fitting, dimensions 1060 and 1061 are equal, and in other embodiments where the walls are loaded then dimension 1060 (the hard stop) is less than dimension 1061 (i.e. before press fitting). In the latter embodiments the loading (i.e. press fitting) reduces the height (orthogonal to the major faces of the substrates) of the second microstructure 71 by at least a factor of 0.99, preferably, at least 0.98, and most preferably, at least 0.975. The factor selected depends on the rigidity (or stiffness) of the microstructure 71 and the required level of loading.

Figure 11:
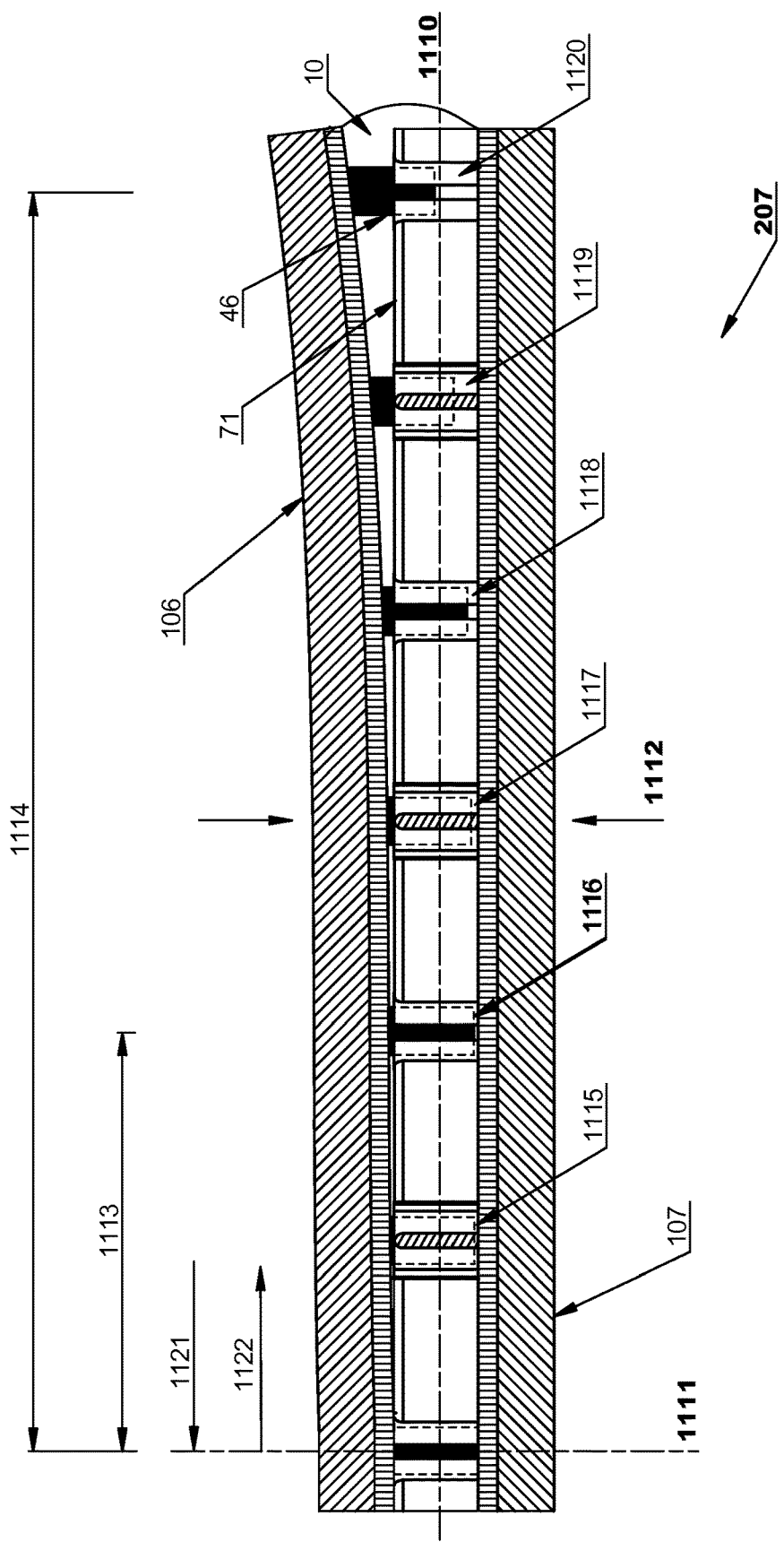
FIG. 11 is a sectional view of embodiment 207 showing the press fitting of first microstructures 46 into second microstructures 71 and the mechanical sealing of fluid 10.

Embodiment 207 is shown in FIG. 7. Its fluid layer is indicated by 307. Fluid 10 is divided into sealed, discrete cavities 83 by press fitting its aligned substrates 106 and 107. Posts 46 fit into annuluses 71b channelling fluid 10 through open slots 1073 as the posts engage (see magnified view 1070). Until posts 46 press against the face of the second substrate 107 the cavities 83 are not isolated from each other and fluid 10 can be channelled through the openings under posts 46. This is advantageous when the second microstructure 71 is loaded as excess fluid 10 can be forced out of a cavity 83 into adjoining cavities through the openings under the micro-fasteners 46. FIG. 11 shows embodiment 207 being laminated. The openings under posts 46 reduce in height as embodiment 207 approaches the NIP point of laminating rollers while press fitting together aligned substrates 106 and 107. Plane 1111 is through the NIP point (or line) of the laminating rollers (the latter are not shown). The line of posts 46 are correctly seated at plane 1111 (see magnified view 1070 in FIG. 7). The nearest line of posts 46 to the NIP point have a slight opening 1115 because posts 46 have not yet fully seated, the next line of posts have a slightly greater opening 1116, and so on for openings 1117, 1118, 1119 and 1120. Advantageously the openings are greatest when the excess fluid 10 in cavities 83 is greatest.

In some embodiments for example the wall height could be reduced by a factor of 0.75 by applying sufficient laminating pressure and establishing a hard stop using micro-fasteners 46 (@0.75×unloaded wall height). In such embodiments the fluid does not impede loading because the excess fluid is channelled through the openings under the micro-fasteners 46 as the volume of cavities is reduced (due to the reducing wall height). It is only when micro-fasteners 46 press against the face of the aligned second substrate 107 that a cavity becomes sealed and its fluid isolated from adjacent cavities.

Magnified view 1070 shows post 46 fully seated and forming a hard stop and seal against the face of the second substrate 107. There is an interference fit between post 46 and the discontinuous annuluses 71b. To seal a cavity 83 the seal must be continuous with the face of the first substrate 106. The discontinuous annuluses 71b have an inverted fillet 1075 to guide posts 46 on coming into contact. The wall portions 71a are filleted as shown by 1071. To ensure a seal the wall portions 71a continue into (or merge with) the annuluses as shown by detail 1074. In this way the top surface 1072 of the wall 71a and the top surface of the annuluses 71b are on the same plane and posts 46 complete a cavity's continuous seal at the face of the first substrate as shown in magnified view 1070.

Figure 8:
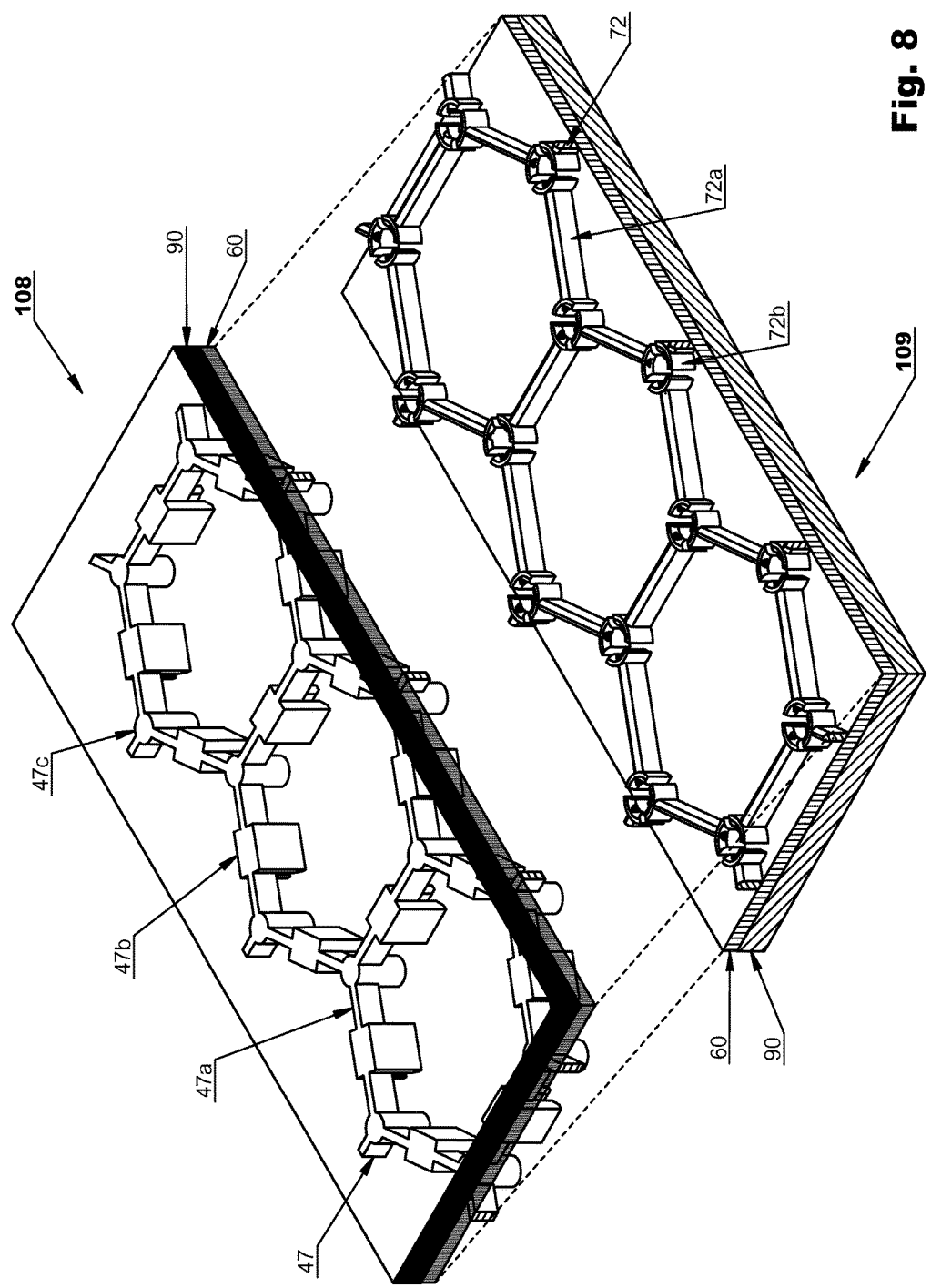
FIG. 8 shows an isometric projection of first substrate 108 (including first microstructures 47(a, b, c)) and second substrate 109 (including second microstructures 72(a, b)).
Figure 9:
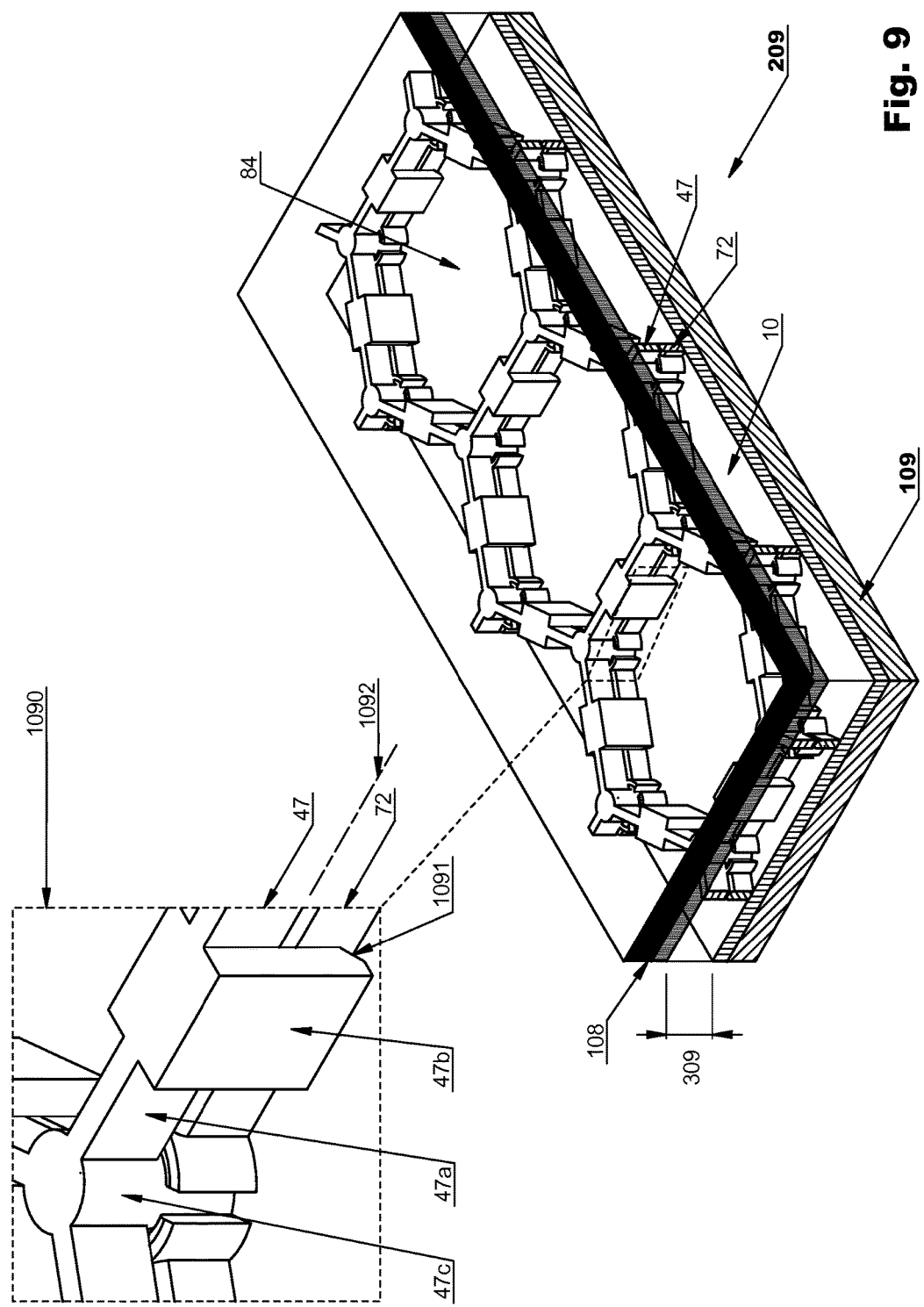
FIG. 9 shows an isometric projection of embodiment 209 including fluid layer 309, sealed fluid cavities 84, and substrate 108 joined to substrate 109.

FIG. 8 shows substrates 108 and 109 offset from each other, aligned, and before joining in a device. FIG. 9 shows these substrates press fitted together in embodiment 209. The first substrate 108 is shown face-down and has hexagonal first microstructure 47(a, b, c) formed on its electrode surface 60. Microstructure 47 comprises parts whose purpose is described as wall portions 47a, micro-fastening plates 47b, and micro-fastening posts 47c. The second substrate 109 has a corresponding hexagonal microstructure 72 comprising wall portions 72a and discontinuous annulus portions 72b formed on its electrode surface 60.

FIG. 9 shows embodiment 209. Its fluid layer is indicated by 309. Fluid 10 is divided into sealed, discrete cavities 84 by press fitting aligned substrates 108 and 109. Posts 47c fit to discontinuous annuluses 72b and plates 47b fit to wall portions 72a. Similar to embodiment 207 (see FIG. 7), until posts 47c press against the face of the aligned second substrate 109 the cavities 84 are not isolated from each other and fluid 10 can be channelled through the openings under posts 47c.

In embodiment 209 the first (47) and second (72) microstructures both comprise wall portions and these wall portions are arranged to be inline so that their respective heads come into contact with each other within the fluid layer 309 as shown in FIG. 9 and the magnified view 1090. The sealing plane for the head of wall 47a with the head of wall 72a is indicated by dashed line 1092 in the magnified view 1090. Unlike previous embodiments the sealing plane 1092 for the wall portions of the microstructures is in the fluid layer 309 and offset from the respective juxtaposed parallel spaced apart major surfaces of the substrates. In embodiments the offset from the major surface of the first substrate 108 can be from 0.05 to 0.95 times the cell gap of the fluid layer 309. An advantage of embodiment 209 over the previous embodiments is that wall portions 47a brace micro-fastening plates 47b and posts 47c and result in a contact area for the first microstructure 47 (a, b, c) with substrate 108 similar to that for the second microstructure 72(a, b) to substrate 109.

In magnified view 1090 the height of micro-fastening posts 47c and plates 47b are equal and both establish the cell gap of the fluid layer 309. In some embodiments the height of plates 47b is less than posts 47C to ensure that the latter set the cell gap of fluid layer 309 and make a seal to the surface of the second substrate 109. Micro-fastening plates 47b are chamfered as indicated by 1091 to guide the plates onto aligned wall portions 72a during the press fitting together. In some embodiments the first microstructure 47 can have a black colourant (i.e. dye or pigment) in its polymer and the second microstructure 72 can be clear. With this arrangement one microstructure acts as a black mask for the other and absorbs light that would otherwise pass through the wall portions of the microstructures.

Figure 10:
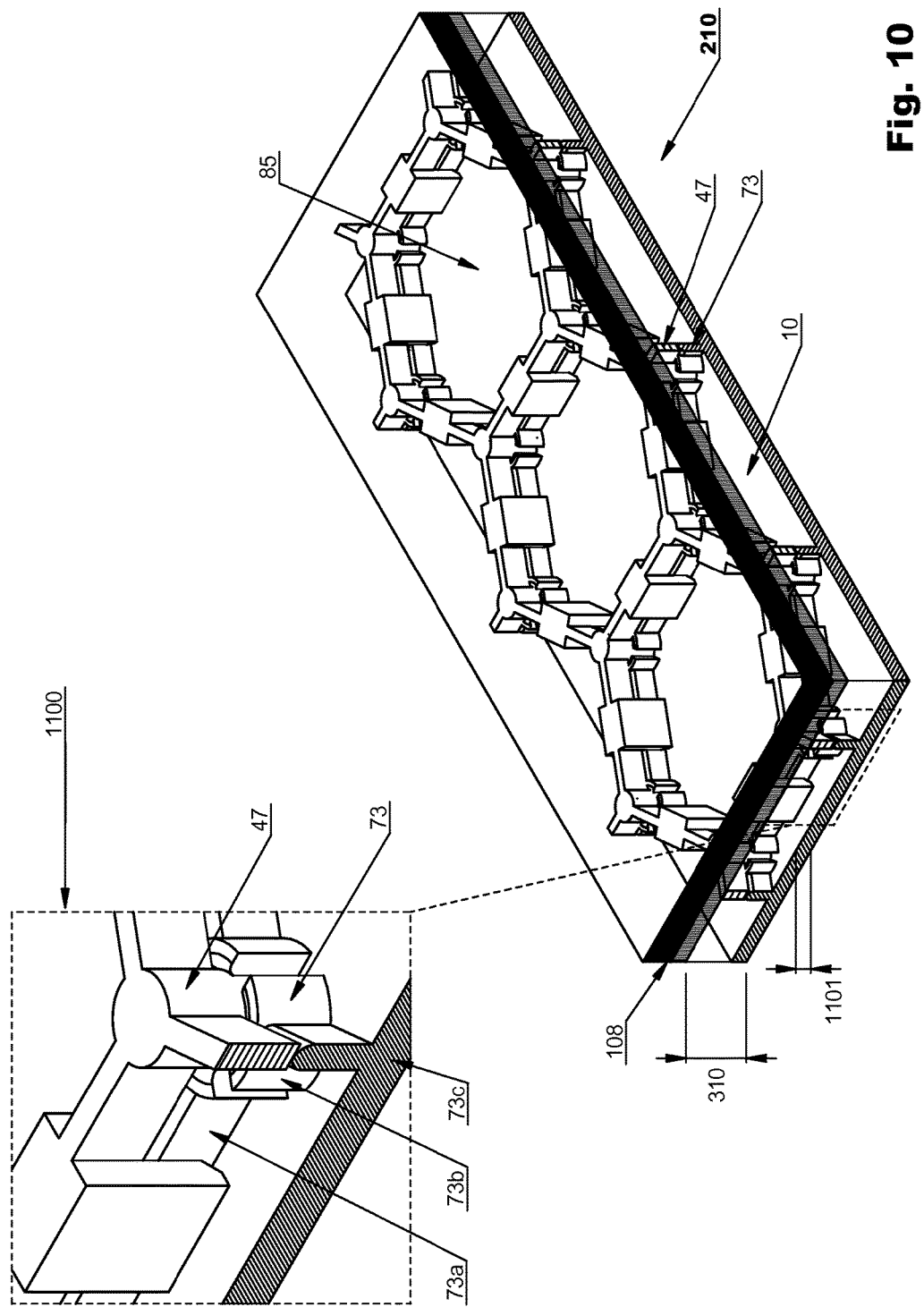
FIG. 10 shows an isometric projection of embodiment 210. The second microstructure 73 has a planar part 73c that is the device's second substrate.

FIG. 10 shows embodiment 210 and it is a version of embodiment 209. Its fluid layer is indicated by 310. Fluid 10 is divided into sealed, discrete cavities 85 by press fitting aligned substrates 108 and microstructure 73(a, b, c) comprising substrate portion 73c. The first microstructure is 47(a, b, c) and is shown in FIG. 8. Posts 47c fit to discontinuous annuluses 73b and plates 47b fit to wall portions 73a (see magnified view 1100). Embodiment 210 shows that a device's substrate need not be a separate part. It (i.e. 73c) can be integrally moulded with a wall portion 73a and micro-fastening portion 73b to be a single or homogeneous entity. Substrate portion 73c can be coated with an electrode (or conductive polymer) on its outer major surface to apply an electrical field across the fluid layer 310, or the device can be bonded with an adhesive layer (e.g., a pressure sensitive adhesive (PSA)) to a rigid or flexible pane that is already coated with an electrode layer. In alternative embodiments device 210 can be bonded to an active matrix substrate (rigid or flexible) incorporating independently addressable electrodes in the shape of pixels. In another alternative embodiment the electrode of the first substrate is patterned to implement in-plane switching of the fluid layer 310 and the second substrate 73c doesn't have an electrode. In still other embodiments device 210 can be used in thermotropic and phototropic embodiments where there is no need for electrodes on either substrate.

To press fit device 210, microstructure 73 can be formed on a sacrificial carrier substrate such as a release liner. After press fitting (by lamination) substrate 108 to aligned microstructure 73 the release liner is peeled and discarded. In an embodiment having similarities with devices 209 and 210, microstructure 73 is formed on an electrode coated substrate so that substrate 73c is a dielectric layer overlain on the electrode layer. In a related embodiment to the latter, an electrokinetic device has recess portions in 73c so that fluid 10 (i.e. the electrokinetic ink) contacts the electrode only in the recess portions and otherwise has a polymer dielectric layer covering its surface. Background information on electrokinetic displays can be found in HP's U.S. Pat. No. 7,957,054.

FIG. 11 shows embodiment 207 being laminated and was mentioned earlier in relation to FIG. 7. Plane 1111 is through the NIP point (or line) of the laminating rollers. The latter are not shown but they apply force radially to aligned substrates 106 and 107 as indicated by the pair of arrows 1112. The direction of lamination is indicated by arrow 1121 and substrates 106 and 107 travel in the direction indicated by arrow 1121 as first microstructures 46 progressively engage second microstructure 71. In embodiments flexible substrates are held under tension by an unwinding station before lamination and optionally by a rewinding station after lamination (not shown in FIG. 11). At the NIP point the posts 46 are fully engaged completing their press fit into annuluses 71*b* (see FIGS. 6 and 7). In FIG. 11 the nearest line of posts 46 to the NIP point have a slight gap 1115 to the surface of the substrate 107 because posts 46 have not yet seated. The next line of posts has a slightly greater gap 1116, and so on for gaps 1117, 1118, 1119 and 1120.

The NIP rollers force excess fluid 10 to the non-laminated side as indicated by 1122 (i.e. the fluid reservoir side). As posts 46 near the NIP point plane 1111 wall portions 71*a* (see FIG. 6) may already be in contact with the surface of first substrate 106 sealing cavities to substrate 106. In this case excess fluid 10 can be channelled through the openings/gaps under the posts 46 until the latter form a seal with the surface of the second substrate 107, only then is fluid 10 isolated within cavities 83.

In FIG. 11 the plane 1110 corresponds to a plane equidistant from the juxtaposed parallel spaced apart major surfaces of aligned substrates 106 and 107, the NIP point of the laminating rollers lies on the plane, and plane 1111 is perpendicular. Distance 1113 is the pitch of cavities 83 along plane 1110. Distance 1114 indicates the point when the heads of microstructures 46 clear the plane 1110 and in FIG. 11 the distance is about three times a cavity's pitch. Substrate 107 is shown as a rigid substrate in FIG. 11 whereas substrate 106 is flexible and conforms to the NIP roller surface. It will be appreciated that at the distance 1114 the head of the second microstructure 71 would clear the heads of the first microstructures 46 if both substrates were flexible and in contact with their respective roller surfaces. In a laminating example the cell gap of the fluid layer 307 is 60 microns, the cavity pitch 1113 is 300 microns, the distance 1114 is about 950 microns, and the diameter of the two NIP rollers is 300 mm or about 1,000 times the cavities' pitch.

In some embodiments the substrates are maintained under alignment while laminating by firstly matching the tension of each in an unwinding station that feeds each substrate to the laminating station, and secondly using fiducials, or aligning microstructures, or a substrate edge to guide alignment parallel to the NIP rollers. In some embodiments the alignment of the first and second microstructures on their respective first and second substrates is optimized for a specific laminating temperature (e.g., 20 degrees Celsius) or range. In some embodiments the linear thermal expansion coefficients of the substrates are matched and track each other over a processing window. Trials have shown that flexible glass substrates are advantageous in maintaining alignment during lamination. Suitable flexible glass can have a thickness of 30 to 200 microns and for example is available from Nippon Electric Glass Co. Ltd in 50 microns or 100 microns roll formats. In preferred embodiments the two substrates are the same material, and most preferably, the substrates comprise side-by-side strips slit from a wider film. For example, a 3M wide ITO coated film is slit to provide matching 1.5M wide rolls. One roll is used for the first substrate and the other for the second substrate while preserving their correspondence from before slitting. In some embodiments the laminating temperature is chosen to maximize alignment of the substrates while at the same time minimize the force required to press fit the microstructures (i.e. to overcome the interference fit).

In embodiments the microstructures and the substrates have sufficient flexibility to allow the device to conform to the curvature of a cylinder of radius 300 mm, and preferably, radius 100 mm, and most preferably, radius 50 mm. As the diameter of the NIP rollers is reduced (for example to about 300 times the cavities' pitch) then the greater the deforming of the microstructures required during lamination as described in the next paragraph.

As the first (46) and second (71) micro-fasteners engage (at distance 1114 from the NIP point) one or both must elastically deform slightly to overcome the curvature of their respective substrates (i.e. the curvature of the NIP rollers) and allow the posts 46 to be pushed into the discontinuous annuluses 71*b*. In the previous paragraph's laminating example the amount of this deforming is less than 0.04 microns. The requirement for elastically deformable microstructures was described earlier in relation to having an interference fit and in relation to loading the wall portions 71*b*. To enhance compatibility with laminating, the microstructures' polymer is elastically deformable.

A suitable deformable polymer for use in embodiments includes flexible polymers. In some embodiments one or both microstructures comprise an elastomeric solid polymer characterized by a glass transition temperature (i.e. Tg) less than 20 degrees Celsius (i.e. 293K) and possessing cross-links. In some embodiments Tg is less than the minimum operating temperature required for an application. In some embodiments the rigidity of a microstructure's elastomer polymer can be selected using the level of crosslinking. In some embodiments an elastomer can be filled with dispersed hard material (i.e. filler) to increase its rigidity, tear strength and durability under loading. Examples of filler material include precipitated silica, fumed silica, ground quartz, black pigment nanoparticles, carbon fibres or nanoparticles, or ceramic fibres or nanoparticles. In embodiments the elastic modulus of the solid polymer is selected to provide suitable elastic deforming of the first and second microstructures, and the modulus lies in the range 2 MPa to 200 MPa, and more preferably, 3 MPa to 100 MPa. In embodiments the tear strength of the solid polymer used in the microstructures is selected to lie in the range 7.5 kN/m to 75 kN/m at 20 degrees Celsius, and more preferably, 9 kN/m to 50 kN/m. The minimum tear strength at the maximum operating temperature (e.g., 90 degrees Celsius) is selected to be ≥7.5 kN/m. In embodiments the linear thermal expansion coefficients of the polymers used in the first and second microstructures are matched to avoid (or minimize) the relaxation of loading on the joints during temperature cycles.

As described earlier in relation to embodiment 203 (see FIG. 3) the micro-fastener is press-fitted to the aligned wall microstructure and provides an interference fit. As a general guideline the width of the inner part exceeds the opening of the outer part by about 2 to 4 percent (of the opening). For example, in embodiment 203 the width of walls 70 in the area of a joint (see 1012 in FIG. 2*b*) is 1.04 times the width between the micro-fasteners 43*a* and 43*b* (see 1002 in FIG. 1*b*). In embodiment 207 shown in FIG. 11 the corresponding interference fit is provided by the diameter of posts 46 exceeding the hole diameter of annuluses 71*b*, and the post diameter is 1.04 times the hole diameter. In embodiments the interference fit lies in the range from 0.5% to 8% of the opening width or diameter, and preferably, from 1% to 6%, and more preferably, from 1.5% to 5%. In some embodiments the selected interference percentage is sufficient to ensure an interference fit despite the manufacturing tolerance of the first and second microstructures. Advantageously in embodiments the polymer of the first and/or second microstructures elastically deforms on press-fitting due to significant interference, and this results in significant friction between the parts. Furthermore, the use of elastically deformable polymer microstructures in embodiments results in significant resistance to relaxation of the loading (or stress) on the joints over time or in response to externally applied shocks.

Figure 12:
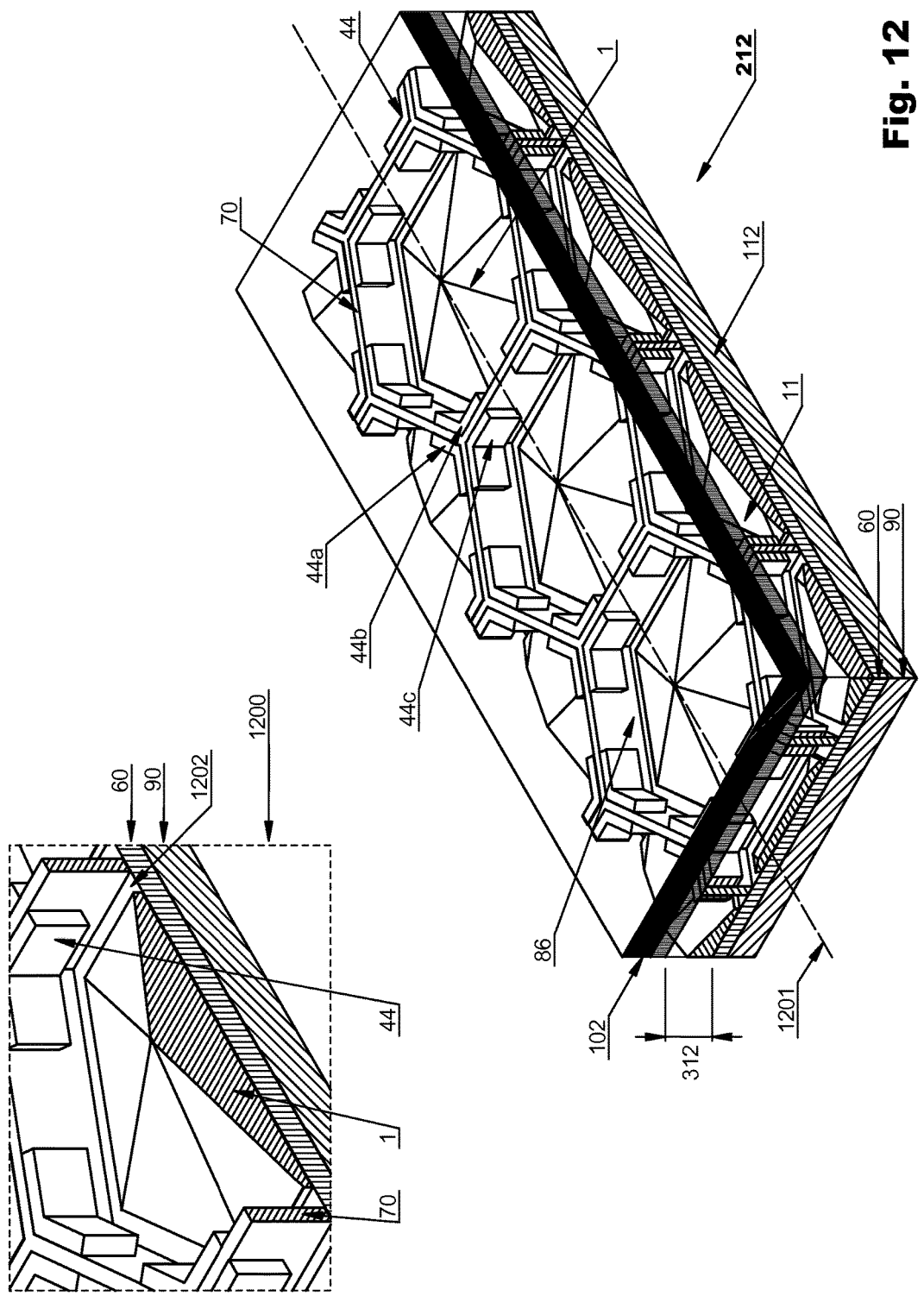
FIG. 12 shows an isometric projection of embodiment 212 including electrophoretic ink layer 312, sealed fluid cavities 86, and first microstructures 44(a, b, c) joined to second microstructure 70.

FIG. 12 shows embodiment 212. The fluid layer 312 has electrophoretic ink 11 divided into sealed, discrete cavities 86 by aligning and press fitting the first substrate 102 (see FIG. 3) to the second substrate 112. The first microstructure 44(a, b, c) and the walls 70 of the second microstructure were described earlier in relation to embodiment 204 shown in FIG. 4. In addition to walls microstructure 70, device 212 has protrusions microstructure 1 on the electrode surface 60 of the second substrate 112. Walls 70 and protrusions 1 are formed at the same time by a suitable micro-replicating process such as moulding or embossing (see the later description of moulding). Magnified view 1200 shows a section through a cavity 86 orthogonal to the juxtaposed parallel spaced apart major surfaces of the substrates and along the dashed line 1201. In a transparent light state (not shown) charged black particles in electrophoretic ink 11 in a cavity 86 concentrate on the second substrate's electrode 60 adjacent to walls 70 having been deflected from their path in an electrical field by the surface of protrusions 1. In a strongly light attenuating dark state the charged particles in ink 11 are uniformly spread on the electrode surface 60 of the first substrate 102 within a cavity 86. The operation of the electrophoretic ink 11 is described in greater detail in the applicant's application WO/2014/146937 titled "An Electrophoretic Device Having a Transparent Light State". In another embodiment protrusions 1 are formed on the surface of the first substrate along with the micro-fastening plates 44(a, b, c), and the second substrate has only walls similar to substrate 101 shown in FIG. 2a. In this embodiment preferably a cavity's micro-fasteners 44 are integrated with (or linked by) protrusion 1 so that the latter brace the former.

FIG. 13a shows a section through first microstructure 48(a, b) and second microstructure 74 before both are press fitted. To guide the heads of microfastening plates 48a and 48b onto the head of wall 74 both are filleted as indicated by 1302 and 1303 respectively. In embodiments the angle 1301 is less than 90 degrees so that the head of 74 is thinner than its base, and similarly for the plates 48a and 48b. In some embodiments the head of a microstructure is thinner/narrower than its base by at least a factor of 0.95, preferably, 0.75, more preferably, 0.5, and most preferably, 0.33. The thinner heads of microstructures provide more space 1300 for the first and second microstructures to overlap before contact. In FIG. 13a plate 48a is braced by rib 1308 and 48b by angled rib 1309.

FIG. 13b shows a section through first microstructure 48(a, b) and second microstructure 74 after both are press fitted. The top surface of wall 74 is indicated by 1307 and is in contact with the surface of the first substrate (not shown) to seal a cavity. The engagement length 1305 is equivalent to the height of microstructures 48a and 48b and is less than the height 1306 of wall 74. In embodiments this engagement length (i.e. orthogonal to the juxtaposed parallel spaced apart major surfaces of the substrates) is from one tenth to ten tenths of the cell gap of the fluid layer. FIG. 13c shows a face view corresponding to FIG. 13b.

FIG. 14a shows a section through first microstructure 49(a, b) and second microstructure 75 before both are press fitted. To guide the heads of microfastening plates 49a and 49b onto the head of wall 75 both are chamfered as indicated by 1402 and 1403 respectively. The angle 1405 is the angle of the chamfer. The role of angle 1401 is similar to the angle 1301 described in relation to FIG. 13a. The chamferred heads of microstructures provide more space 1400 for the first and second microstructures to overlap before contact.

FIG. 14b shows a section through first microstructure 49(a, b) and second microstructure 75 after both are press fitted. The top surface of wall 75 is indicated by 1407 and is in contact with the surface of the first substrate (not shown) to seal a cavity. The height 1406 of wall 75 after press fitting is equal to the cell gap of the fluid layer. FIG. 14c shows a face view corresponding to FIG. 14b. The faces of 49a and 49b that mate with wall 75 are serrated or roughened as shown in magnified view 1408 to enhance friction of the joint after press fitting. Advantageously in embodiments serrated or roughened mated surfaces deform within the joint over time increasing the joint friction and counteracting load relaxation over time.

In some embodiments the first and second microstructures are fused either during or after press fitting to enhance chemical bonding (i.e. intermolecular forces) in the joints. Fusing requires the polymer of one or both microstructures to slightly melt (i.e. to be a thermoplastic) at some temperature that is greater than the device's operating temperature but still less than the maximum service temperature of the substrates and the fluid.

In some embodiments the first and second microstructures are plasma or corona treated just prior to press fitting to enhance chemical bonding in the joints.

Figure 15C:
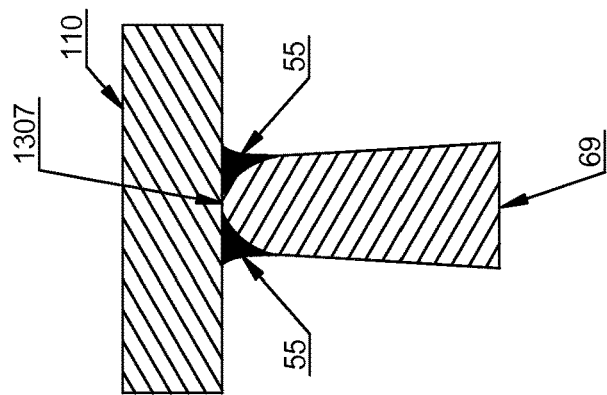
FIG. 15c is a sectional view showing the wall part of microstructure 69 mechanically sealed to the first substrate 110. Sealing gel 55 fills a local volume either side of the joint.
Figure 15B:
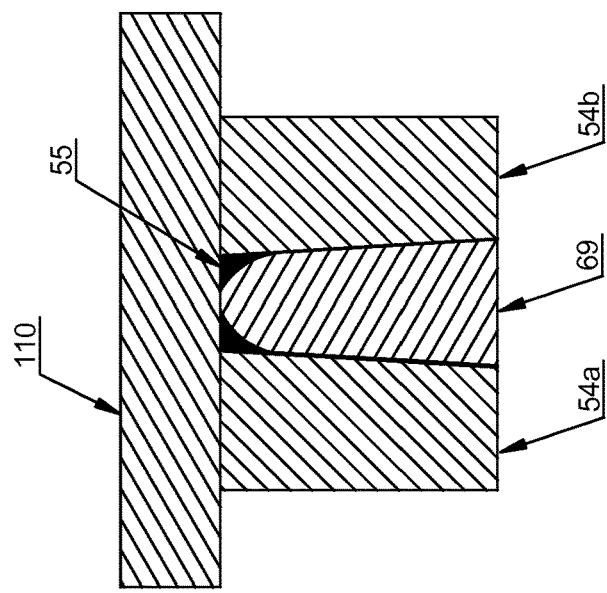
FIG. 15b is a sectional view showing the micro-fastening part of the microstructures of FIG. 15A joined in an embodiment. Sealing gel 55 fills areas of the joint not filled by contact between microstructures 54 and 69.
Figure 15A:
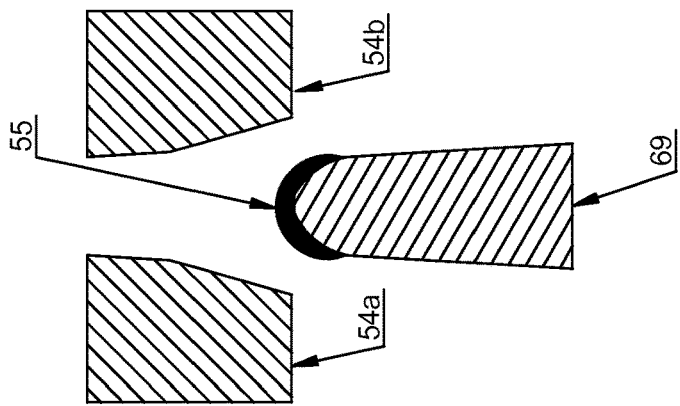
FIG. 15a is a sectional view showing first microstructures 54(a, b) and second microstructure 69 before they are joined in an embodiment. A sealing gel material 55 covers the head of microstructure 69.

FIG. 15a shows a section through first microstructure 54(a, b) and second microstructure 69 before both are press fitted. The head of wall portions 69 is coated with a sealing gel 55. FIG. 15b shows the micro-fasteners after press fitting. Sealing gel 55 provides an additional seal either side of the seal (i.e. contact area) between second microstructure 69 and the surface of first substrate 110 in the micro-fastening joint area. FIG. 15c shows that the sealing gel 55 also provides additional sealing (after press fitting) about the mechanical seal between walls 69 and the surface of substrate 110. Sealing gel 55 is selected to be insoluble in the fluid of the fluid layer. For example, sealing gel 55 could be a fluorinated, quasi-crosslinked (or gel) polymer.

In a related embodiment polymerizable, flexible adhesive replaces sealing gel 55 in FIGS. 15a to 15c. After press fitting the adhesive is cured by photo or thermal means and provides both additional seals (as described for sealing gel 55) and covalent bonds either side of the mechanical seal between the second microstructure 69 and the surface of the first substrate 110. Similar to the sealing gel 55, preferably the polymerizable, flexible adhesive is not soluble in the fluid of the fluid layer and has sufficiently high molecular weight to have a gel-like consistency (i.e. high viscosity). In embodiments the cured adhesive must be at least as flexible as a device's substrates. Advantageously, the polymerized, flexible adhesive located at or about the micro-fastener joints (see FIG. 15b) lock the joints against unloading, relaxing, or loosening due to fatigue, the impact of external shocks, or vibrations.

Figure 16A:
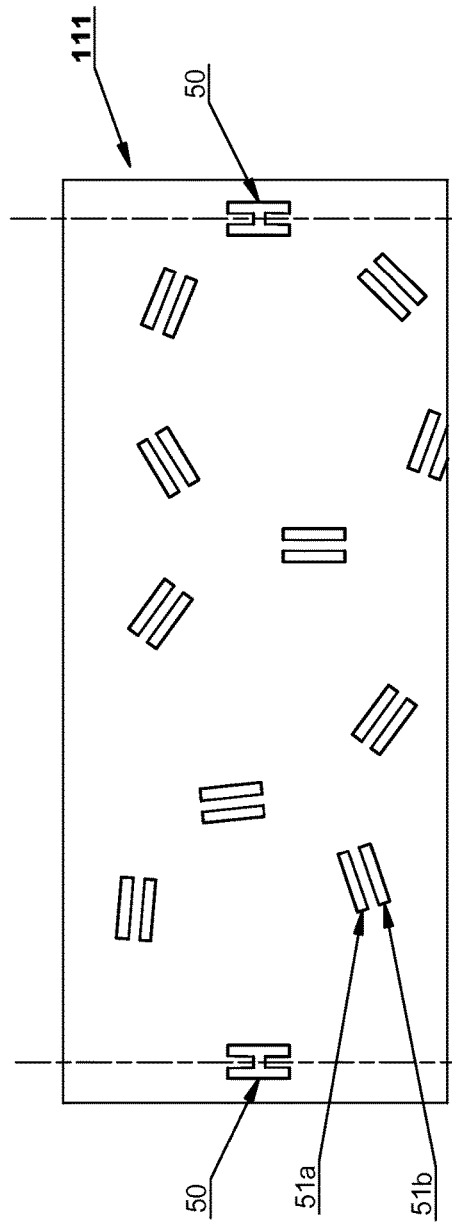
FIG. 16A shows a first substrate 111 and first microstructures 50 and 51(a, b). The former (i.e. 50) is an aligning micro-fastener.
Figure 16B:
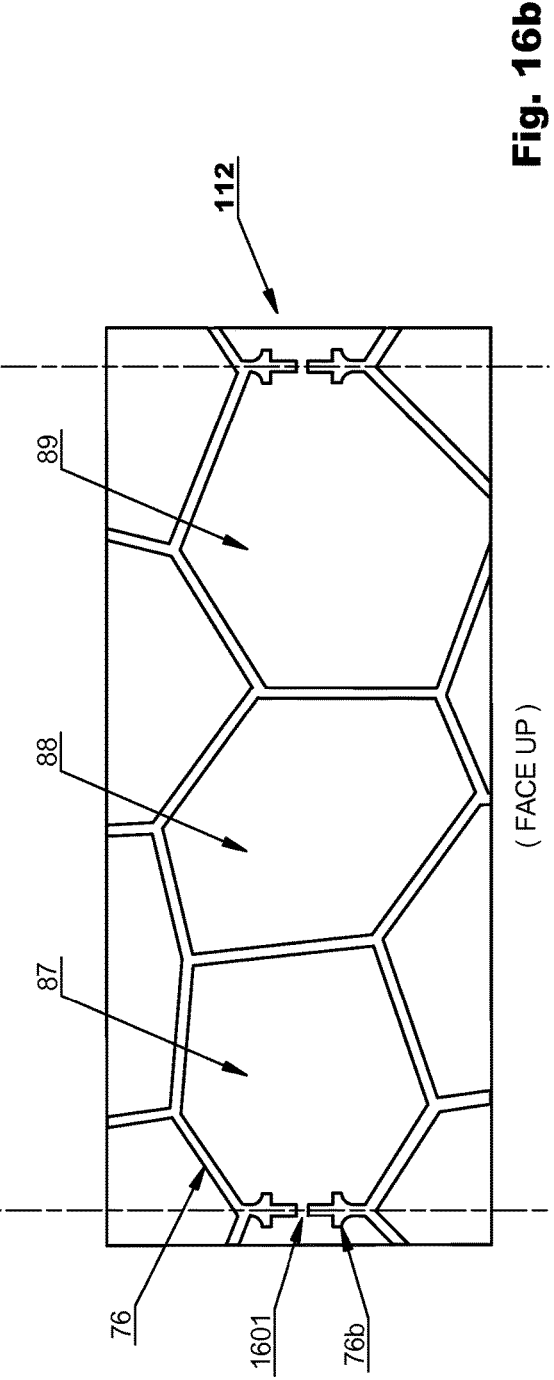
FIG. 16B shows a second substrate 112 and second microstructures 76(a, b). Fluid cavities 87, 88 and 89 are quasi random.
Figure 17:
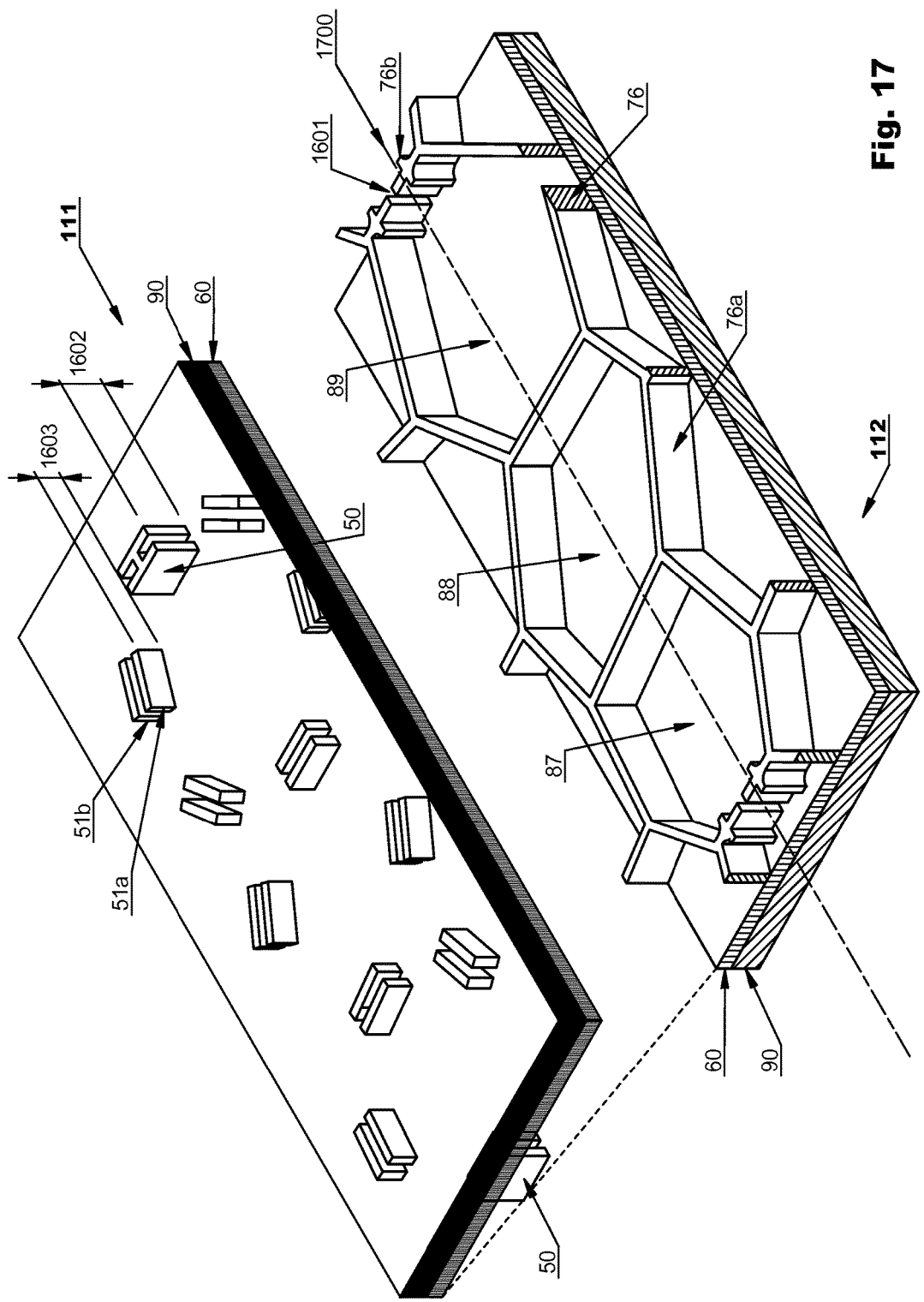
FIG. 17 shows an isometric projection of first substrate 111 and second substrate 112.

FIG. 16a shows a first substrate 111 and its microstructures 50 and 51(a, b) are arranged to press fit to the microstructure 76 of the second substrate 112 shown in FIG. 16b. FIG. 17 shows both substrates offset from each other in an isometric projection with the first and second microstructures aligned. Embodiments that use these substrates have quasi random fluid cavities with 87, 88 and 89 indicated. The quasi random pattern of the microstructures on the electrode surfaces of the substrates is confined in one axis and repeats. The pitch of the repeating pattern is indicated as 1600 in FIGS. 16a and 16b. The pattern repeats parallel to the NIP point of laminating rollers, and that means orthogonal to the laminating direction. In FIG. 17 the dashed line 1700 shows the laminating direction corresponding to the repeating pattern indicated by 1600 (FIGS. 16a and 16b). As shown earlier in relation to FIG. 3 (dashed line 1030), the laminating direction of embodiments can be orthogonal to that shown in FIG. 17 in which case the pattern repeating direction would be orthogonal to that shown in FIGS. 16a and 16b. In preferred embodiments the quasi-random pattern repeats in both axis of a device's face and is a grid pattern. In embodiments the orientation of a grid pattern can be independent of the laminating direction but as described earlier for FIG. 3 preferred orientations avoid having cavity walls parallel to the NIP point of the laminating rollers.

It will be appreciated that in order to press fit the first and second substrates of embodiments, that their respective microstructures must firstly be arranged to fit together (i.e. follow the same layout pattern), and secondly, the microstructures must be aligned to be press fitted. In previous embodiments (i.e. before describing FIG. 16) cavities were regular (hexagonal) and so it is sufficient to align the wall microstructure of any cavity to the micro-fasteners of any cavity. In embodiments that have regular cavities the microstructures of any one cavity are interchangeable with the microstructures of another. Substrates 111 and 112 (FIGS. 16a to 17) repeat in one axis as shown by dimension 1600. It follows that the first microstructures 50 and 51 of a pattern instance are interchangeable and can be joined with any pattern instance of the second microstructure 76.

Preferably embodiments confine their quasi-random pattern to be a repeating grid pattern so that the microstructures of any one grid instance (or area) are interchangeable with the microstructures of another. For example, an embodiment has a quasi-random cavity pattern with a nominal cavity major axis of 300 microns arranged in a grid that repeats in one axis every 0.9 mm (e.g., similar to dimension 1600 in FIG. 16a) and in an orthogonal axis every 1.8 mm. If the cavities have a square profile then each pattern instance in the grid will have 18 cavities. In this example whole grid instances have interchangeable microstructures but if the substrates are offset by less than a whole grid pattern then the quasi-random cavities within a grid are not interchangeable. The latter is equivalent to the impossibility of joining the microfasteners 51a and 51b for cavity 87 with the wall 76 of cavity 88 in FIG. 17.

The first and second microstructures of substrates 111 and 112 have two types of micro-fasteners. Micro-fastener 50, and its interoperable microstructure on 76 (see slot 1601 and flange 76b in FIG. 17), align the repeat pattern of the microstructures, and micro-fasteners 51a and 51b are plates and join the substrates together. It will be appreciated that aligning micro-fastener 50 also joins the substrates but their incidence is much lower than micro-fasteners 51(a, b). In some embodiments the engagement length 1602 of aligning micro-fasteners 50 is greater than the engagement length 1603 of the other micro-fasteners. The longer engagement length of the aligning fasteners 50 means that contact between the substrates is made firstly by the aligning microstructures and these bring the first and second substrates into alignment before the micro-fasteners 51(a, b) come into contact with wall portions 76a. In FIG. 17 the micro-fastener 50 defines the start of a repeating pattern. In embodiments the slot 1601 and/or the flanges 76b ensure alignment in both axes of the major surfaces of the substrates.

It will be appreciated that micro-fasteners 50 and their interoperable microstructures on 76 (see slot 1601 and flange 76b in FIG. 17) are discontinuous or open so that the fluid is channelled out of joints allowing the microstructures to correctly seat when press fitted. The design of the aligning micro-fasteners 50 can also be used in place of the parallel plates of micro-fasteners 51a and 51b and in this case the engagement length is preferably reduced from 1602 to 1603 (see FIG. 17). Correspondingly, the interoperable microstructures on microstructure 76 have openings or slots 1601 to channel excess fluid from cavities during press fitting of the microstructures by NIP rollers similar to that described earlier in relation to FIG. 11.

FIG. 18 shows a more complete device whereas previous figures showed only a section of much larger devices as described earlier. Embodiment 203 was previously shown in section form in FIG. 3. Apart from having far more cavities than the section drawing, FIG. 18 also shows the connection ledges 403 and 404 and the other two device sides. Connecting ledge 403 has the second microstructure 70 exposed. Advantageously, a conductive ink or polymer can be applied with a uniform thickness to substrate 101 by using walls 70 to control the thickness of the coating. Similarly first microstructure 43 can control the thickness of its conductive ink coating, and each microstructure anchors its conductive coating improving the coating's adhesion to the respective substrates. In alternative embodiments the microstructures can be removed in the connection ledges by wiping with a suitable solvent for the polymer of the microstructures.

In FIG. 18 the sides of device 203 have ruptured cavities 480 adjacent to intact cavities 80. The ruptured cavities are confined to the edge of sides (including the two sides having connection ledges) and for these cavities the fluid 10 is not sealed and leaks out. Preferably the fluid from ruptured cavities 480 is wiped away or otherwise removed before using the device in an application. Apart from an edge area that is less than the width of a cavity, all the other cavities of an embodiment are self-sealed by press fitting. Furthermore, a smaller area device can be cut from a larger device (e.g., in the form of a roll of film) and other than ruptured cavities at the edges of the newly cut sides both devices (i.e. the larger one and the cut-out) are self-sealed.

Figure 19:
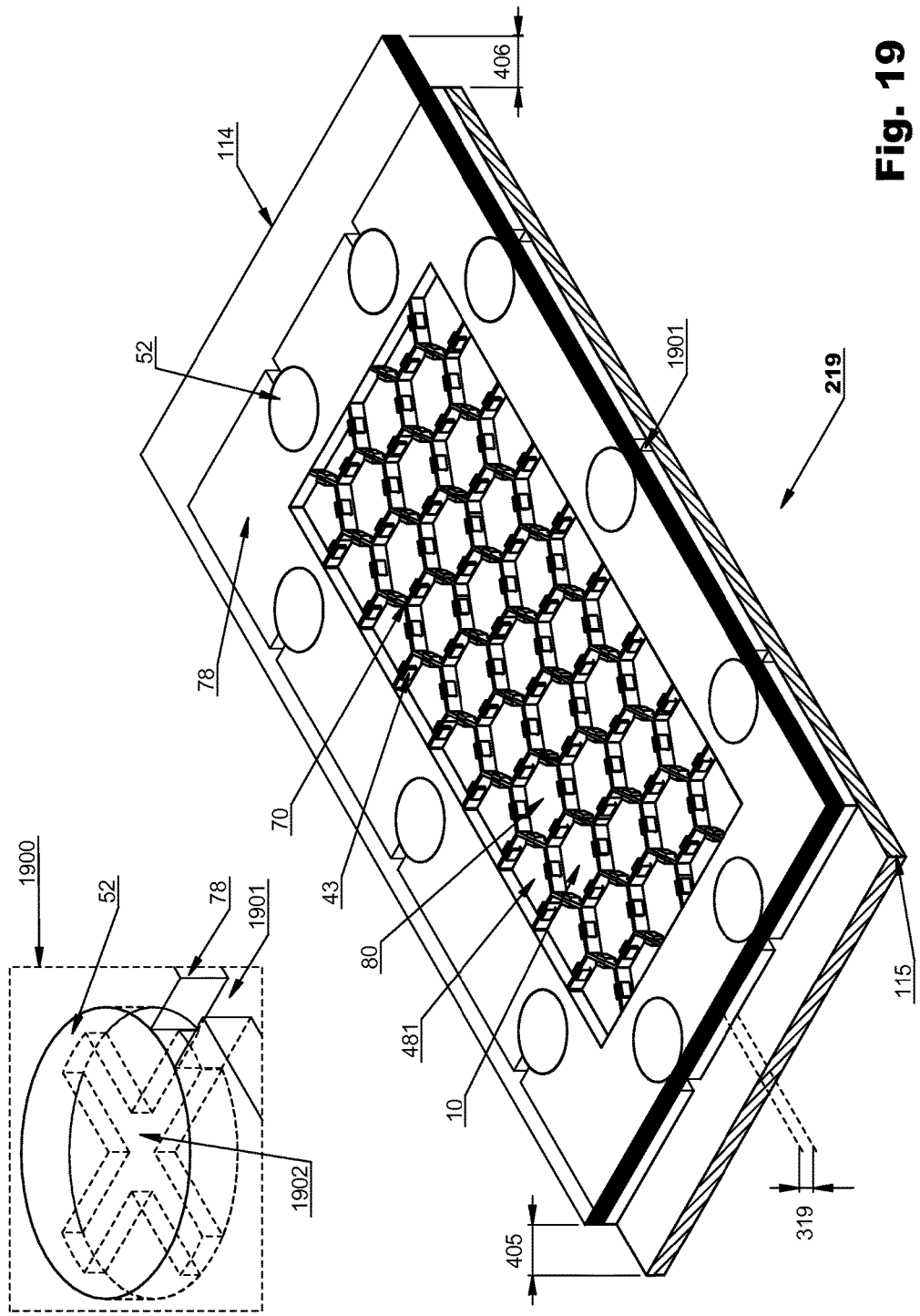
FIG. 19 shows an isometric projection of embodiment 219. An additional mechanical seal about the periphery of the switchable area comprises first microstructure 52 and second microstructure 78.

FIG. 19 is similar to FIG. 18 in that it shows a more complete device. Embodiment 219 combines the embedded micro-fasteners and cavity wall microstructures of embodiment 203 with a peripheral micro-structured edge seal. The micro-structured seal is a press fitting of aligned micro-fastening portions 52 and wall portion 78. Cavities 481 along the peripheral seal are sealed and the device has no ruptured cavities. The first microstructure is formed on the major surface of substrate 114 and comprises micro-fasteners 43 and 52. The second microstructure is formed on the juxtaposed parallel spaced apart major surface of substrate 115 and comprises wall microstructures 70 and 78. The fluid layer is indicated by 319. Connection ledges are shown as 405 and 406.

Advantageously, micro-fasteners 52 and wall 78 are visible by eye and can be used to align both substrates ahead of press fitting. For example, along the leading peripheral seal edge the micro-fasteners can be partially press fitted by hand or machine and then the device loaded onto a laminator and fluid 10 introduced between the substrates (see FIG. 11). The device is then correctly aligned and ready to be press fitted together by laminating between NIP rollers.

In some embodiments some microstructures on the respective first and second substrates are located outside the device area in the leading edge area for lamination. Their purpose is to prealign a device's first and second substrates ahead of lamination. Similar to the leading peripheral seal edge in the previous paragraph, these micro-fasteners can be partially press fitted by hand or machine and then the device loaded onto a laminator and fluid 10 dispensed between the substrates (see FIG. 11). These external (to a device) alignment microstructures are cut from the device after lamination. FIG. 20 shows a related embodiment 220 that has alignment microstructures that do not subsequently form part of a device.

The peripheral edge seal in embodiment 219 does not trap fluid 10 when posts 52 are press-fitted into mating holes in the wall microstructure 78 because slots 1901 channel fluid 10 from under the posts 52 to the outside as the latter are forced into the former. The magnified view 1900 shows a post 52 and a hole in the peripheral seal 78. The height of slot 1901 is the same as the cell gap of the fluid layer 319. The view 1900 also shows a cross shaped recess 1902 as dotted lines in post 52. The recess 1902 in the top surface of the post 52 is open to the slot 1901. Fluid 10 is channelled in the recess 1902 to the slot 1901 as the post 52 is press fitted in the presence of fluid 10. It will be appreciated that in other embodiments the peripheral seal microstructures can be based on any of the cavity microstructures already described. For example, dispersed plate micro-fasteners similar to 43a and/or 43b (see FIG. 3) can be press fitted to a continuous peripheral seal wall similar to cavity wall 70 (see FIG. 3).

Embodiment 219 is suited to the volume production of identical devices. The device can be produced as a repeated device on a continuous roll of film and then stamp cut or laser cut from the roll of film. Alternatively, the first and second microstructures of a device can be repeated on respective continuous rolls of film and then these device structures cut to provide discrete substrates before joining a device's first and second substrates. In another alternative a continuous roll of film is cut into sheets corresponding to a device, then the microstructures are formed on each substrate sheet and the sheets aligned and joined along with the fluid in a lamination step.

Examples of applications suited to device 219, and requiring volume production of identical devices, include automotive sunroofs or visors. In some applications the added peel adhesion of the peripheral edge seal is well suited to more extreme conditions such as when the device's edges are exposed. For example, a smart window can have embodiment 219 bonded to a glass pane on one side only leaving its other substrate exposed.

FIG. 20 shows an embodiment 220 that is a roll of film. The top substrate 116 and bottom substrate 117 are both flexible polymer films such as PET, or a flexible glass film. Device 220 combines the embedded micro-fasteners and cavity wall microstructures of embodiment 203 with peripheral aligning and sealing microstructures. The micro-structured aligning and sealing is a press fitting of micro-fastening portions 53 and wall portions 68. Cavities 482 along the peripheral seal are sealed and the device has no ruptured cavities along these edges. The first microstructure is formed on the major surface of substrate 116 and comprises micro-fasteners 43 and 53. The second microstructure is formed on the juxtaposed parallel spaced apart major surface of substrate 117 and comprises wall microstructures 70 and 68. The fluid layer is indicated by 320. The direction of lamination is indicated by 2001.

Micro-fasteners 53 and walls 68 are used to help maintain the alignment of both substrates during lamination (i.e. press fitting). In some embodiments micro-fasteners 53 and walls 68 are visible by eye. In addition to the aligning effect of press fitting microstructures 53 and 68 an electronically controlled alignment system can use a sensor (e.g., a camera) to track and position both microstructures as their respective substrates are unwound under tension and fed to the laminator to ensure the first and second microstructures are aligned in the direction of film travel (i.e. direction 2001).

In common with other embodiments, prior to starting lamination, the first and second microstructures are partially press fitted by hand (or machine) assisted by magnification. The two peripheral alignment structures (i.e. 53 and 68) assist with this alignment. The leading edge of the press fitted substrates is then lowered to the NIP point of the laminating rollers and about 100 mm or more of the leading edge passed through the NIP point with one or both laminating rollers being driven. The device is then correctly aligned and ready to be press fitted together. Fluid 10 is dispersed between the substrates and forms a reservoir of fluid extending from the NIP point. Advantageously, the leading edge provides a sealed starting edge for the device's roll. It will be appreciated that the leading edge area that was used to establish alignment before fluid 10 was introduced is a sacrificial area and not used to form a switchable device.

The peripheral alignment microstructures in embodiment 220 do not trap fluid 10 when key 53 is press-fitted to the slot (or recess) formed between walls 68. During lamination fluid 10 is channelled within the slot and flows parallel to the direction of lamination (i.e. 2001). In some embodiments posts 52 (see FIG. 19) are integrated with the key microstructure 53 to provide additional alignment. In this case the top of key 53 has a recess along its length (i.e. parallel to the direction of lamination 2001) to channel fluid 10 from under posts 52. Alternatively, the wall microstructure 68 at the film edge can have a recess similar to 1901 used in embodiment 219 (see FIG. 19). In some embodiments fiducial marks are integrated in the first and second microstructures as manufacturing aids. In other embodiments identifying marks or text are integrated.

To prepare an electrically switchable device from a roll of film (such as device 220) the required device area is cut from the continuous roll and includes the areas that will become the connection ledges. The aligning and sealing peripheral area is discarded by cutting it (or slitting it) from the device area. Connection ledges are then prepared similar to that shown for embodiment 203 in FIG. 18 by mechanically slitting one substrate (or laser cutting using a CO2 defined wavelength) and peeling the cut strip from the device. In both cutting means the depth of the cut is precisely controlled to avoid damage to the opposing substrate. Electrical connections are then prepared as described earlier in relation to FIG. 18.

The figures showed embodiments having different shapes of micro-fastener and wall microstructures. The shapes of mating microstructures useful for embodiments include: a plate and a wall, an arm and a wall, a post and a discontinuous hole, a post and a wall, a post and a discontinuous annulus (cylinder), a discontinuous annulus plug and corresponding discontinuous annulus and post, a cantilever and a mating discontinuous recess, or a key and a slot. These shapes use an interference fit and friction. In some embodiments the microstructures use a snap fit with one or both microstructures having undercuts, and these embodiments do not necessarily require an interference fit or friction to join the first and second substrates.

To enhance peel adhesion in some embodiments additional micro-fastening parts can be located within a cavity. For example, a cavity has a centrally located post and discontinuous annulus to provide peel adhesion within a cavity that supplements the peel adhesion provided by the interoperable micro-fasteners and cavity walls. The centrally located micro-fasteners also act as additional spacers in the fluid layer making a device more resistant to externally applied point pressure.

In embodiments a switchable light modulator device is one of the following types, or hybrid versions thereof: an electrophoretic device, a liquid crystal device, a suspended particle device, an electro-wetting device, an electrokinetic device, an electrochromic device incorporating an electrolytic fluid gel, a thermochromic device, or a photochromic device. Advantageously in some embodiments the fluid layer has contact with part of the juxtaposed parallel spaced apart major surfaces of the substrates including a substrate surface comprising: an electrode layer, an inorganic dielectric layer, an organic dielectric layer, a molecular alignment layer, an electrochromic layer, an ion storage layer, or an active matrix top layer. In electrochromic embodiments the fluid is an electrolytic gel and has contact with an electrochromic layer that overlays an electrode on one substrate and an ion storage layer that overlays the other electrode on the other substrate. An example of an electrochromic device is described in Gentex's U.S. Pat. No. 6,934,067. In a hybrid electrochromic/photochromic embodiment the switchable material is a liquid or gel. The switchable liquid or gel is described in Switch Material's U.S. Pat. No. 8,837,032. In a liquid crystal device the fluid is preferably a chiral nematic liquid crystal and a suitable device is described by the applicant in British Patent Application No. 1416385.1 titled "A Chiral Nematic Liquid Crystal Light Shutter". An electrokinetic device is a hybrid of an electrophoretic device and comprises an ink that includes charged particles suspended in a fluid (see earlier description relating to FIG. 10). In a suspended particle device the fluid is a suspension of polyiodide particles dispersed in a polymeric liquid and background information can be found in Research Frontier's U.S. Pat. No. 6,900,923. In an electrowetting embodiment the fluid layer can comprise fluids described in Sun Chemical Corp.'s U.S. Pat. No. 8,854,714.

To minimize haze some embodiments match the refractive index of the microstructures to the fluid, preferably to within 0.02 of each other, more preferably, 0.005, and most preferably, 0.002. Never-the-less, preferred embodiments include a black colourant in the polymer of the first and/or second microstructures to strongly absorb light and avoid light scattering (and consequently haze) allowing mismatched refractive indices for the fluid and solid polymer. Furthermore, embodiments that use black colourant in the solid polymer of a microstructure can use polymer that is not optically transparent. For example, as described earlier the solid polymer can incorporate dispersed, hard filler material. In another example the polymer can have a semi-crystalline structure such as a polyurethane.

To provide in-plane switching in some embodiments the polymer of one or both microstructures is conductive and the microstructure also functions as an electrode within the device.

Next, moulding techniques are described to make the first and second microstructures within embodiments. The moulding techniques can also be described as replication techniques. These and other suitable replication techniques are described in the applicant's WO/2014/146937 titled "An Electrophoretic Device Having a Transparent Light State".

In a moulding technique a hard or soft tool surface is used as a negative mould master and in moulding steps the inverse of the three dimensional (3D) shape of the master's surface is transferred to (i.e. replicated) a substrate. In embodiments the negative mould masters for the first and second microstructures on the respective substrates are designed and made as a pair to ensure the microstructures are interoperable. An example of a hard tool surface is electroformed nickel and its surface is suitable for making up to 100,000 replicas onto a substrate. An example of a soft tool surface is crosslinked polydimethylsiloxane and it can make up to 1,000 replicas. The moulding steps comprise coating the master's surface with a prepolymer and laminating the substrate (optionally the coating is done as part of laminating), curing the coating to inversely replicate the shape of the master's surface in polymer bonded to the substrate, and peeling from the master leaving the replicated microstructure on the substrate. Preferably the moulding steps are identical for both substrates.

A hard, negative, mould master can be made from a polymer template by electroforming nickel onto the template's surface and thereby transferring the polymer template's shape to the surface of a hard mould master. The polymer template's surface is directly formed by optically writing a microstructure into a photosensitive polymer known as a photoresist and developing the resist. The direct writing of the template's surface in a photosensitive polymer includes the technologies described as direct-write lithography, single-point laserwriting, laser interferometry, and electron-beam lithography. Any suitable photoresist can be used including the SU8 series available from www.microchem.com. Directly writing the microstructure exposes the photosensitive polymer and the exposed structure is developed in solution in a separate step. Preferably a computer controlled system uses a laser beam or electron beam (e-beam) to expose the photosensitive polymer and form the shape of the micro-fasteners and/or wall portions of a first or second microstructure. Prior to electroforming the negative mould master on the surface of the polymer template, the template is made more compatible (with electroforming) by depositing a thin (<250 nm) metallic or ceramic conformal coating (or coatings) onto its polymer surface.

In other techniques the three-dimensional surface in a hard master (e.g., metal, silicon, fused silica, or calcium fluoride) is directly formed by material removal. The hard surface can be formed by mechanical milling (e.g., Single Point Diamond Turning), chemical etching, ion-beam milling, reactive-ion etching, or laser ablation to directly form (or write) the replicating surface. Typically the inverse image (i.e. the negative) is directly formed in a small area called a tile and metal foil copies of this area (called shims) used to cover the tool surface, such as the surface of an embossing roller/drum.

The invention claimed is:

1. A switchable light modulator device comprising a fluid layer disposed between opposite spaced apart major surfaces of first and second substrates, each of said substrates having first and second interoperable microstructures formed on said opposite major surfaces, said respective microstructures fitting together to join said first and second substrates and to define wall portions for a plurality of cavities, said cavities sealing said fluid in discrete volumes, wherein said second microstructures define said wall portions and comprise an elastomeric solid polymer characterized by a glass transition temperature less than 20 degrees Celsius and possessing crosslinks.

2. A device according to claim 1 wherein said first and second microstructures are arranged to press fit together.

3. A device according to claim 1 wherein said interoperable microstructures have a repeating pattern in one or both axes of said major surfaces and wherein said microstructures of one pattern instance are interchangeable with those of another.

4. A switchable light modulator device comprising a fluid layer disposed between opposite spaced apart major surfaces of first and second substrates, each of said substrates having first and second interoperable microstructures formed on said opposite major surfaces, said respective microstructures fitting together to join said first and second substrates and to define wall portions for a plurality of cavities, said cavities sealing said fluid in discrete volumes, wherein said first and second microstructures are arranged to press fit together and wherein said first and second microstructures are arranged to have interference when press fitted, and said first or second microstructures provide an opening into which the other fits, and the interference fit lies in the range from 0.5% to 7.5% of the opening width or diameter.

5. A switchable light modulator device comprising a fluid layer disposed between opposite spaced apart major surfaces of first and second substrates, each of said substrates having first and second interoperable microstructures formed on said opposite major surfaces, said respective microstructures fitting together to join said first and second substrates and to define wall portions for a plurality of cavities, said cavities sealing said fluid in discrete volumes, wherein said first and second microstructures are arranged to press fit together and wherein said cavities' wall portions are under load established during press fitting, and cavities are characterized by a wall height that corresponds to the cell gap of said fluid layer and that is less than the wall height before said press fitting by at least a factor of 0.99, and said microstructures provide a hard stop defining said wall loading.

6. A device according to claim 1 wherein said cavities' seals are between said wall portions and said major faces and/or between respective first and second wall portions on said first and second microstructures.

7. A device according to claim 2 wherein said microstructures are arranged to force said fluid out from between said first and second interoperable microstructures by said press fitting.

8. A device according to claim 1 wherein said joining and sealing is enhanced by polymerization of said microstructures once joined, the polymerization providing covalent bonds in said joints and seals.

9. A device according to claim 2 wherein said joints between said microstructures, established during said press fit, micro-fasten said substrates to each other and resist separation due to the sum of counter forces comprising one or more of: friction provided by said joints, suction provided by loading of said cavities' wall portions, and the surface tension of said fluid and the adhesion of said fluid to the interface surfaces of said cavities.

10. A device according to claim 2 wherein said microstructures define one or more openings enabling an excess of said fluid to be forced from said cavities during said press fitting.

11. A device according to claim 1 wherein at least one of said substrates comprises a flexible material.

12. A device according to claim 1 wherein a minority of microstructures are present to align said first and second substrates and these have a greater engagement length than the majority.

13. A device according to claim 1 wherein said microstructures form a quasi-random pattern on said substrates that repeats over a fixed distance across the viewing face of said device or is embedded in a grid pattern across said viewing face.

14. A device according to claim 1 wherein each of said first and second interoperating microstructures comprise either: a plate and a wall, an arm and a wall, a post and a discontinuous hole, a post and a wall, a post and a discontinuous annulus, a discontinuous annulus plug and corresponding discontinuous annulus and post, a cantilever and a mating discontinuous recess, or a key and a slot.

15. A device according to claim 1 wherein said microstructures comprise filleted or chamfered heads, and a head of said microstructures is thinner than a base by at least a factor of 0.85.

16. A device according to claim 1 wherein an engagement length along a length of interoperating first and second microstructures is from one tenth to ten tenths of the cell gap of said fluid layer.

17. A device according to claim 1 wherein said switchable light modulator device is one of the following types, or hybrid versions thereof: an electrophoretic device, a liquid crystal device, a suspended particle device, an electrowetting device, an electrokinetic device, an electrochromic device incorporating an electrolytic fluid gel, a thermochromic device, or a photochromic device.

18. A device according to claim 1 wherein said device's substrates are flexible glass having a thickness less than 200 microns.

19. A method of forming the device according to claim 1 comprising laminating said device's substrates and fluid between a pair of NIP rollers with the substrates held under tension.

* * * * *